United States Patent [19]
Lundie et al.

[11] Patent Number: 5,170,909
[45] Date of Patent: * Dec. 15, 1992

[54] VACUUM SEED METER

[75] Inventors: William R. Lundie, East Moline, Ill.; James C. Martin, Davenport; James L. Tetrick, Eldridge, both of Iowa; Jerry D. Webber, Beaver Dam, Wis.; Jay H. Olson; Richard F. Gallens, both of Moline, Ill.

[73] Assignee: Deere & Company, Moline, Ill.

[ * ] Notice: The portion of the term of this patent subsequent to Jun. 6, 2006 has been disclaimed.

[21] Appl. No.: 883,851

[22] Filed: Jul. 10, 1986

Related U.S. Application Data

[63] Continuation of Ser. No. 546,834, Oct. 31, 1983, abandoned.

[51] Int. Cl.$^5$ .................................................. A01C 7/04
[52] U.S. Cl. ..................................... 221/211; 221/266
[58] Field of Search ................. 221/211, 263, 266, 278; 111/77, 78

[56] References Cited

U.S. PATENT DOCUMENTS

| | | |
|---|---|---|
| 835,040 | 11/1906 | Snyder . |
| 1,331,235 | 2/1920 | Bristow . |
| 2,039,485 | 5/1936 | Hollis .................... 221/130 |
| 2,068,382 | 1/1937 | Kriegbaum ............. 221/125 |
| 2,440,846 | 5/1948 | Cannon .................... 222/9 |
| 2,960,258 | 11/1960 | Dodwell .................. 221/93 |
| 2,991,909 | 7/1961 | Lamazou ................. 221/211 |
| 3,156,201 | 11/1964 | Tweedale ................ 111/77 |
| 3,412,908 | 11/1968 | Ferrault .................. 222/194 |
| 3,434,437 | 3/1969 | Mark et al. ............. 111/85 |
| 3,533,535 | 10/1970 | Knapp ..................... 221/211 |

(List continued on next page.)

FOREIGN PATENT DOCUMENTS

| | | |
|---|---|---|
| 2517758 | 4/1976 | Fed. Rep. of Germany . |
| 2376607 | 8/1978 | France . |

OTHER PUBLICATIONS 24 page "Notice d'Utilisation" manual of Nodet Gougis, on Pneumasem seed meter, no date.

(List continued on next page.)

Primary Examiner—F. J. Bartuska

[57] ABSTRACT

An air seed meter which dispenses individual seeds supplied by a seed hopper into a furrow at a controlled rate as the meter and others like it are advanced over the ground has a generally cylindrical housing containing a rotatable seed disk. As the seed disk is rotated past a mass of seeds on one side thereof, a plurality of seed cells formed by recesses in the surface of the seed disk at one or more circumferential rows of holes adjacent the outer periphery of the seed disk mechanically accelerate and eventually capture therein individual seeds from the seed mass. The individual seeds are held within the cells by a pressure differential created by a vacuum source coupled to the inside of the housing on the opposite side of the seed disk until the cells reach a discharge area. At the discharge area, the effects of the vacuum are cut off so as to release the individual seeds from the cells for discharge through a chute at the bottom of the housing to a seed furrow below. Agitation of seeds within the seed mass with the accompanying mechanical acceleration and capture of individual seeds within the cells may be enhanced by providing fins on the surface of the seed disk and is facilitated by a cell configuration which has a rear wall of greater slope than the front wall of the cell. Doubling of seeds within the individual cells is minimized by limiting the size and depth of the cells relative to the seed and also by use of a relatively low pressure differential which is made possible by the manner in which the cells agitate, mechanically accelerate and then capture the seeds. As a result there is no need for cumbersome and elaborate multiple seed eliminating arrangements.

30 Claims, 12 Drawing Sheets

U.S PATENT DOCUMENTS

| | | | |
|---|---|---|---|
| 4,091,964 | 5/1978 | Harrer | 221/266 |
| 4,162,744 | 7/1979 | Barker et al. | 221/254 X |
| 4,450,979 | 5/1984 | Deckler | 221/263 |
| 3,608,787 | 9/1971 | Grataloup | 222/342 |
| 3,659,746 | 5/1972 | Winslow | 221/185 |
| 3,693,833 | 9/1972 | Weitz | 221/211 |
| 3,796,346 | 3/1974 | Ribouleau | 221/211 |
| 3,888,387 | 6/1975 | Deckler | 221/278 |
| 3,990,606 | 11/1976 | Gugenhan | 221/211 |
| 3,999,690 | 12/1976 | Deckler | 222/194 |
| 4,047,638 | 9/1977 | Harrer et al. | 221/266 |
| 4,074,830 | 2/1978 | Adams et al. | 221/266 |

OTHER PUBLICATIONS 13 page "Notice d'Utilisation" manual of Nodet Gougis, on Pneumasem seed meter, no date.

9 page "Pieces de Recharge" manual of Nodet Gougis, on Pneumasem seed meter, no date.

3 page "Operating Instructions And Parts List" of Nodet Gougis on pneumasem II precision seed drill, dated Feb. 1979.

6 page brochure of Nodet Gougis on "pneumasem II" vacuum planter, no date.

6 page brochure of Nodet Gougis on "pneumasem II" seed drill, no date.

"Operator's Manual" on White 5100 Seed Boss Planter, dated Feb. 1980.

Pages 15 and 199 from an Allis-Chalmers publication on a seed meter, no date.

2 page brochure of Gaspardo on "SPS10", no date.

VACUUM SEED METER

This is a continuation of co-pending application Ser. No. 546,834 filed on Oct. 31, 1983 now abandoned.

BACKGROUND OF THE INVENTION

1. Field of the Invention

The present invention relates to seed meters for dispensing individual seeds at a controlled rate into a seed furrow as the seed meter is advanced along the furrow, and more particularly to air seed meters in which a rotating element coupled to a source of air pressure or vacuum picks up individual seeds from a seed mass and subsequently discharges the seeds therefrom in controlled fashion as the element continuously rotates.

2. History of the Prior Art

Seed meters of various designs have been employed to dispense seeds at a controlled rate into a seed furrow a the seed meter is advanced along the furrow. In a typical arrangement a tractor is coupled to tow a tool bar to which are attached in generally parallel, spaced apart relation a plurality of planting units with seed meter arrangements attached thereto. Each of the planting units includes a seed hopper for containing a quantity of the seed to be planted, a device for opening a furrow as the tractor drawn tool bar is advanced over the ground, a seed meter coupled to the seed hopper for dispensing individual seeds into the furrow at a controlled rate and a further device for moving soil at the sides of the furrow to close the furrow over the seeds. The planting unit may further include containers for insecticide and fertilizer together with apparatus for dispensing controlled amounts of each.

Planting arrangements of the type described typically have apparatus including rotatable wheels in contact with the ground or other distance monitoring devices for controlling the rate of discharge of seeds from the seed meter so that the proper seed spacing is achieved. The tractor typically moves across the ground at a speed of 4–8 miles per hour. The spacing between individual seeds in each furrow can range from as little as 0.6 inch or less to as much as 15 inches or more depending upon the type of seeds being planted. The seed meters must accordingly be capable of dispensing seeds at a very high rate on the order of 200 seeds per second or greater as well as at rates which are considerably lower. The many different types of seeds which are typically planted in this fashion include corn, cotton, sorghum, sugar beets, soy beans and sunflower. Such seeds vary considerably in both size and shape. For example, corn seeds are among the largest and have an irregular surface. Soy bean, cotton and sunflower seeds are slightly smaller an tend to be rounded, elongated and very elongated in shape, respectively. Sorghum and sugar beet seeds are still smaller and generally spherical, the former having a relatively smooth outer surface and the latter having a very rough and irregular outer surface. Despite such differences in size and shape, seed meters are expected or required to handle two or more or even all of the different types of seeds described with a minimum of part changes and adjustments. At the same time required standards of planting accuracy typically require a low error rate. A missed seed or a doubling of seeds is undesirable and may be allowed only very infrequently. Such requirements place considerable demands upon the accuracy of the seed meters.

Some seed meters used in planting arrangements of the type discussed are of the mechanical type in which mechanically actuated fingers or similar mechanical devices are typically used to separate individual seeds from a seed mass and then dispense them into the furrow. While mechanical seed meters are satisfactory for certain applications, they typically suffer from a number of limitations which include a limitation in the speed at which they can accurately dispense seeds, an inability to handle different types of seeds without making cumbersome and extensive part changes, and an inherent design complexity which may typically add to the cost, wear and maintenance problems of the seed meters.

An alternative type of seed meter which uses an air pressure differential has been developed in an effort to overcome some of the problems of mechanical seed meters. Air pressure differential seed meters, which are commonly known as air seed meters are generally of two types, the first being the positive pressure type and the second being the vacuum type.

In the positive pressure type of air seed meter, air is blown into the seed chamber and onto the surface of a rotating or otherwise movable member in order to create a higher than atmospheric pressure in the chamber. This forces seeds from a seed mass onto the member where they are retained for later release. The rotating member is typically provided with apertures open to atmosphere where the individual seeds are held by the blowing air until the seeds are dispensed by interrupting the flow of air to the seeds.

Examples of positive pressure type air seed meters are provided by U.S. Pat. Nos. 3,888,387 of Deckler, 4,047,638 of Harrer and 4,074,830 of Adams. In the Deckler patent pressure is applied to a disk having irregularly shaped pockets for the seeds and radial passages for air flow. A separate pressure gate is employed to help eliminate excess seeds and to discharge the seeds from the disk. In the Harrer patent pressure is applied to a disk having clamshell-shaped pockets in which the individual seeds are held by the pressure differential until discharge by passage of the disk through a region that is isolated from the pressurized air. In the Adams patent pressurized air is also applied to a disk having seed-carrying pockets. Once the seed is in the pocket, the pockets contact a flat sealing surface to hold the seeds in the pockets until discharge is desired. Still other patents which relate to this type of arrangement include U.S. Pat. No. 3,999,690 of Deckler which describes a stainless steel wear plate driven by the metering disk and which is wear resistant, and U.S. Pat. No. 4,091,964 of Harrer which describes in further detail a sealing pad for use in the arrangement of the Adams patent.

While air seed meters of the positive pressure type offer certain advantages over mechanical seed meters, they have certain limitations of their own which may prove to be a significant disadvantage for various applications. Because the seeds are held in place on the rotating disk or other movable member by differential pressure resulting from positive pressure in the chamber, it is usually necessary that the air flow be directed through the seed mass to aid in the depositing of individual seeds on the disk. The air flow has been found to interfere with the orderly delivery of seeds down to the disk, so that even a very high pressure differential will not necessarily guarantee the avoidance of seed doubles or voids at the various apertures in the disk. In positive pressure systems, the seed hopper must be sealed to maintain pressure. If for any reason the hopper lid comes off or the hopper otherwise becomes unsealed, the seed meter will not function.

Vacuum seed meters have been found to overcome some of the problems in the positive pressure seed meters. In vacuum seed meters a vacuum source is typically coupled to a separate chamber on the opposite side of a seed disk from the seed mass with the vacuum communicating through the apertures in the seed disk to the seed mass. Because the pressure differential at the seed disk comes from a vacuum source on the opposite side thereof and not from a flow of air at the same side thereof as in the case of the positive pressure type of seed meter, the problems of having to direct an air flow through the seed mass and onto the seed disk are eliminated.

Despite the various advantages of vacuum seed meters over meters of the positive pressure type, presently known vacuum seed meters are not without problems of their own. For one thing a relatively high power vacuum source is typically required to provide the large pressure differential needed in order to accelerate the seeds to the speed of the rotating seed disk and thereafter hold the seeds on the disk at the apertures in the disk. Because of the difficulty in accelerating the seeds from the mass to the speed of the seed disk for adherence thereto, various mechanical agitating arrangements are sometimes used at the expense of increased complexity in the construction and operation of the seed meter. A further problem which is aggravated when a large pressure differential is present is that of excess seeds being picked up on the seed disk. Because of this tendency, many vacuum seed meters must be equipped with multiple seed eliminating devices or arrangements to insure that only one seed remains at each aperture in the seed disk as the disk reaches the seed discharge and delivery area. Multiple seed eliminating devices must be adjusted from meter to meter across the planter, thereby increasing operator start-up time. A large pressure differential also creates problems in releasing the seeds from the disk and frequently requires the use of seed ejectors or other devices which complicate the design and operation of the seed meter.

A typical example of a conventional vacuum seed meter is provided by U.S. Pat. No. 3,608,787 of Grataloup. The arrangement shown in this patent which includes a perforated seed disk and a vacuum source requires a special plate containing hollows and projections engaging the seed disk to eliminate multiple seeds. In U.S. Pat. No. 3,990,606 of Gugenhan, a drum has a seed plate attached thereto on which seeds are held by vacuum. The arrangement shown therein requires an interruptor device to close each hole at the discharge position while a seed ejecter device engages the outer surface of the plate. German Patent No. 25 17 758 describes a vacuum seed meter which includes an apertured disk and a distributor wheel with a ring of scoops thereon. French Patent No. 2 376 607 shows a vacuum system having a rotating plate with pockets for selecting potato tubers, one by one.

An example of an earlier and somewhat different design of a vacuum meter is provided by U.S. Pat. No. 3,533,535 of Knapp. In the Knapp patent vacuum is used to hold seeds or other objects within clamshell shaped cells communicating with holes in a rotating drum. The surface of the drum which is comprised of elastomeric material is distorted by spring-loaded plungers which project into the holes in the drum to flatten the cells and aid in seed ejection. U.S. Pat. No. 3,434,437 of Mark et al is exemplary of a separate accelerating mechanism for accelerating seeds from a seed mass to the speed of the seed drum. Likewise, in U.S. Pat. No. 2,991,909 of Lamazow a paddled stirrer is employed to agitate the seeds.

Accordingly, it would be desirable to provide a vacuum seed meter requiring a relatively small pressure differential. It would furthermore be desirable to provide a vacuum seed meter in which seeds are readily accelerated to the speed of and picked up by the seed disk without the need for separate seed agitating and accelerating mechanisms and in the presence of a relatively small air pressure differential. It would be of still further advantage to provide a vacuum seed meter in which the problem of seed doubling or the picking up of excess seeds is minimized. It would be of still further advantage to provide a vacuum seed meter in which seeds held to a seed disk by vacuum are readily and reliably released from the seed disk without the need for complicated release mechanisms.

BRIEF SUMMARY OF THE INVENTION

The present invention provides a vacuum seed meter in which the use of a relatively low power vacuum source and the resulting low pressure differential are made possible, at least in part, by a seed cell configuration within the rotating seed metering disk. The seed cell configuration acts either alone or in some cases in combination with fins located on the surface of the disk to provide sufficient agitation and mechanical acceleration of seeds in the seed mass so that the seeds are picked up by and held within the cells by the relatively low pressure differential from the vacuum source. At the same time the seed cells are configured so as to greatly minimize the problem of doubling or other unwanted aggregation of plural seeds at any one cell. The seeds carried by the seed disk are readily and reliably released for discharge from the seed meter by simply preventing communication of the vacuum source with a portion of the seed disk.

In a preferred embodiment of a vacuum seed meter in accordance with the invention a seed metering disk rotatably mounted within the hollow interior of a generally cylindrical housing divides the housing into first and second chambers adjacent the opposite first and second sides respectively of the seed disk. Seeds from a hopper mounted above and adjacent the seed meter flow through entry chutes at the back of the generally cylindrical housing to a first or seed chamber separated from the entry chutes by a seed baffle. Within the first or seed chamber the seeds form into a mass thereof against the first surface of the seed disk. A vacuum source is coupled to the second chamber within the housing where it communicates with the first chamber and with the seed mass contained therein through one or more rows of apertures circumferentially disposed adjacent the outer periphery of the seed disk.

Seed cells are defined by a plurality of recesses in the first surface of the seed disk. Each of the recesses is associated with a different one of the apertures in the seed disk. The flat front wall of the seed cell provides for easy entry of the seed into the cell. Each seed cell is configured to have a back wall of steeper slope than the front wall thereof. The steeply sloped back walls of the seed cells are effective in agitating and mechanically accelerating seeds from the seed mass to the speed of the seed disk so that individual seeds can enter and be retained within the seed cells by the force created by the pressure differential. At the same time the seed cells are configured so as to be larger but not substantially larger than the seeds contained therein and to have a relatively shallow depth such that the seed protrudes beyond the first surface of the seed disk. This acts to prevent doubling or accumulating excess seeds on the seed disk. The problem of excess seeds is also enhanced by the presence of the low pressure differential vacuum which tends to be only strong enough to hold a single seed within each seed cell. Each aperture is located relative to the walls of the adjoining seed cell so as to allow only one seed to be positioned directly over the aperture.

Seed release is provided for by a barrier wall within the second chamber which prevents the vacuum source from communicating with a portion of the seed disk. An opposite portion of the first chamber which is also defined by a barrier wall within the chamber serves as a seed discharge chamber such that when seeds within the seed cells on the disk enter such chamber they are released from the seed cells for discharge through a chute or opening at the bottom of the meter housing. A seed retainer brush mounted on the barrier wall within the first chamber bears against the side of the seed disk and prevents seeds from entering the seed discharge chamber.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

Figure 1:
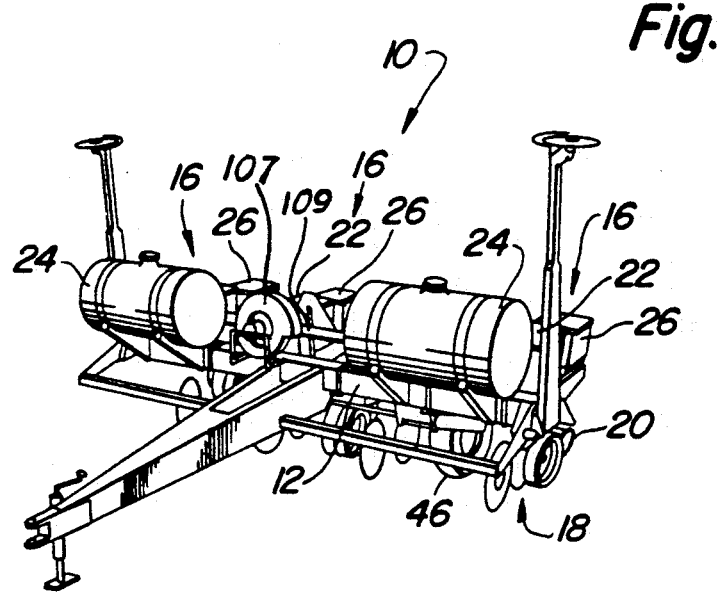
FIG. 1 is a perspective view of a towable implement including a plurality of planting units with vacuum seed meter arrangements constructed in accordance with the invention.

FIG. 1 depicts a planting implement 10 including a main frame 12 which is supported by a plurality of wheels 46 and is adapted for towing in a forward direction by a tractor. Attached to the main frame 12 are a plurality of different planting units 16 mounted in generally parallel, side-by-side relationship across the length thereof.

Figure 2:
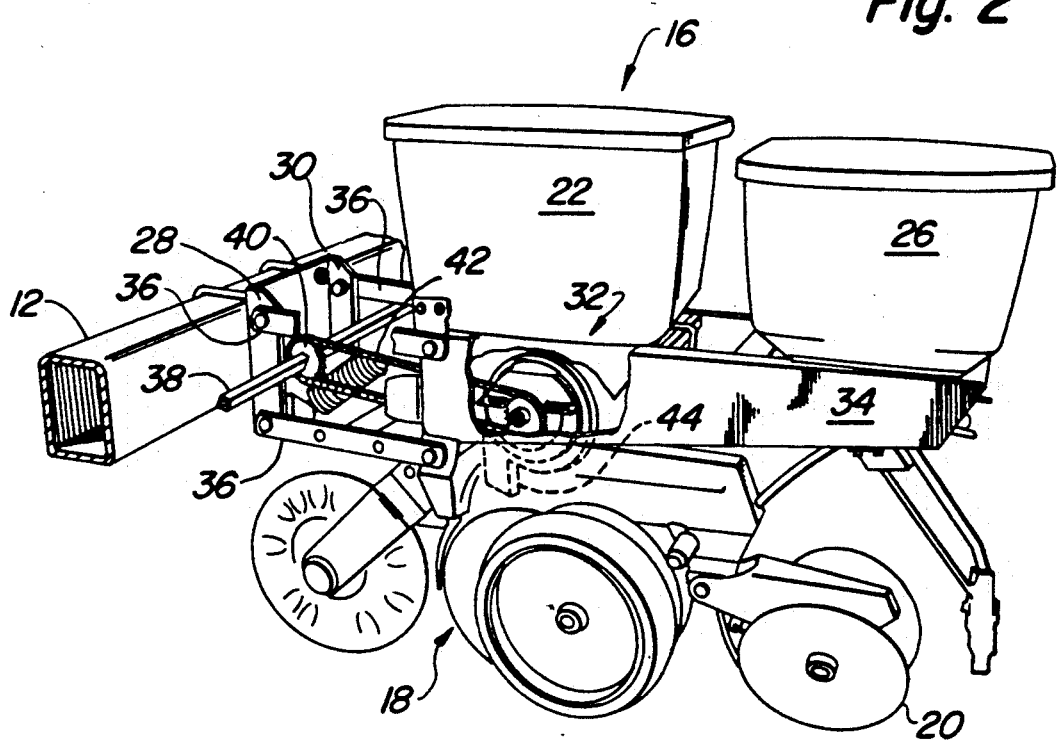
FIG. 2 is a perspective view of a portion of one of the planting units of FIG. 1 with a vacuum seed meter arrangement in accordance with the invention.

As described hereafter in connection with FIG. 2 each of the planting units 16 includes an opener 18, closing wheels 20, a vacuum seed meter (not shown in FIG. 1) and a seed hopper 22. As the tractor advances the main frame 12 over the ground, the opener 18 of each of the planting units 16 opens a furrow in the ground. As described hereafter, seeds from each of the seed hoppers 22 flow into an associated seed meter from which individual seeds are dispensed into the furrow at a controlled rate. The closing wheels 20 which trail both the seed meter and the opener 18 close the furrow onto and over the seeds dispensed by the seed meter.

In addition to the planting units 16, a plurality of fertilizer hoppers 24 are mounted across the length of the main frame 12. The fertilizer hoppers 24 which are capable of containing fertilizer are provided with conventional apparatus for dispensing controlled amounts of the fertilizer as seed planting is performed by the planting units 16. Mounted at the back of the planting units 16 are a plurality of pesticide hoppers 26. The pesticide hoppers 26 which are capable of containing insecticide are provided with conventional apparatus for dispensing controlled amounts of insecticide where desired in conjunction with the planting of seeds by the planting units 16.

FIG. 2 depicts one of the planting units 16. The planting unit 16 is mounted on the back of the main frame 12 by a pair of generally vertical brackets 28 and 30. The seed hopper 22 which has a vacuum seed meter 32 coupled to the bottom thereof is disposed within a frame 34. The frame 34 trails behind and is capable of undergoing up and down motion relative to the main frame 12 and the attached brackets 28 and 30 by a plurality of arms 36. Two of the arms 36 are pivotably coupled to both the bracket 28 and one side of the frame 34. The other two arms 36 are pivotally coupled to the bracket 30 and to the opposite side of the frame 34.

An elongated shaft 38 is rotatably mounted behind the main frame 12. A plurality of chain sprockets 40 are mounted at different locations along the length of the shaft 38 such that each chain sprocket 40 is disposed between the brackets 28 and 30 of a different one of the planting units 16. The chain sprocket 40 shown in FIG. 2 is coupled by a chain 42 to a second chain sprocket 43 which is mounted below the seed hopper 22 at one side of the seed meter 32. The second chain sprocket 43 is coupled to rotate a seed disk within the vacuum seed meter 32 to provide the dispensing of individual seeds from a seed discharge chute 44 at the bottom of the vacuum seed meter 32.

Referring again to FIG. 1 the arrangement shown therein includes a wheel 46 which is maintained in contact with the ground so as to roll over the ground as the planting implement 10 is advanced by the tractor. The wheel 46 is coupled to the shaft 38 at the back of the main frame 12 by an arrangement of chains and sprockets (not shown) so as to rotate the shaft 38 as the wheel 46 rotates. The shaft 38 rotates at a speed in direct proportion to the rotational speed of the wheel 46 and therefore in direct proportion to the speed at which the main frame 12 and the various planting units 16 are moving over the ground. Accordingly, the shaft 38 rotates at a speed directly related to the speed of movement of the main frame 12 over the ground. By coupling the shaft 38 to the vacuum seed meter 32 via the chain sprocket 40, the chain 42 and the second chain sprocket 43, the rate of seed discharge from the vacuum seed meter 32 is coordinated with the speed of the main frame 12. Thus, as the speed of the tractor and thereby the main frame 12 increases, the rate of seed discharge from the vacuum seed meter 32 is increased accordingly so that uniform seed spacing within the furrow is maintained. Likewise, when the speed of the main frame 12 decreases, the rate of seed discharge from the vaccum seed meter, 32 decreases by a corresponding amount so as to maintain the seed spacing constant. The seed spacing is itself a variable by varying the connection between the wheel 46 and the shaft 38 so that the shaft 38 rotates at different rates relative to the wheel 46.

As shown in FIG. 2 the opener 18 is disposed in a forward location of the planting unit 16. The opener 18 opens a furrow in the ground into which the individual seeds from the vacuum seed meter 32 are discharged at the desired spacing. The closing wheels 20 which are disposed rearwardly of the planting unit 16 collapse dirt from the opposite sides of the furrow into the furrow wall and cover the seeds discharged by the vacuum seed meter 32.

In actual practice the tractor typically moves over the ground at a speed of 4-8 miles per hour during seed planting. Seed spacing within the furrows can range from as little as 0.6 inch to as much as 15 inches between adjacent seeds. Accordingly, the rate of seed discharge from the vacuum seed meter 32 can vary greatly from a very low discharge rate on the order of five seeds per second or less such as where the tractor is traveling on the order of 4 miles per hour and 15 inch seed spacing is required to a very high rate on the order of 200 seeds per second or greater where the tractor is traveling at a faster speed and a seed spacing of as little as 0.6 inch is required. It will therefore be appreciated that the vacuum seed meter 32 must be capable of dispensing seeds at a rate which can vary substantially. Further complicating matters is the fact that seed meters such as the vacuum seed meter 32 should be capable of handling different types of seeds of different size and surface characteristics. And, in any event, the vacuum seed meter 32 must be capable of dispensing the seeds accurately. This means that one seed and no more than one seed is planted at each desired location along the length of the furrow. The discharging of two or more seeds into the furrow at any one location, which is sometimes referred to as "doubling", is undesirable at the very least and is unacceptable for many planting operations. Conversely, the missing or skipping of a seed at any one of the desired seed locations along the length of the furrow s also undesirable. Various planting operations may allow a missed seed only very infrequently so that plant population does not vary more than a few per cent.

Figure 3:
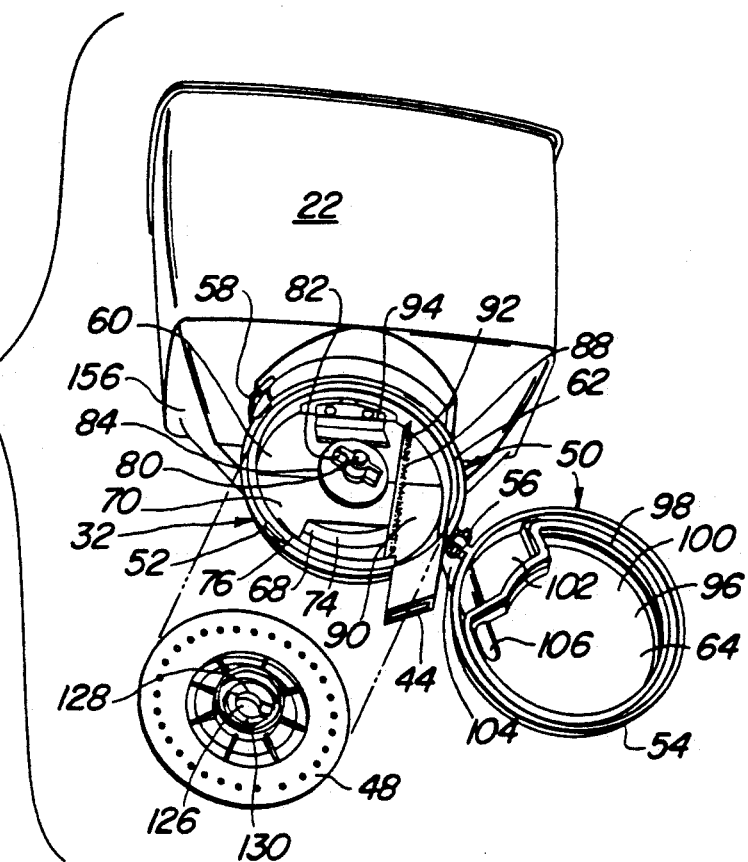
FIG. 3 is a perspective view of a portion of the vacuum seed meter arrangement of FIG. 2 showing a seed hopper in conjunction with a vacuum seed meter which is disposed in an open position in conjunction with a removable seed disk.
Figure 12:
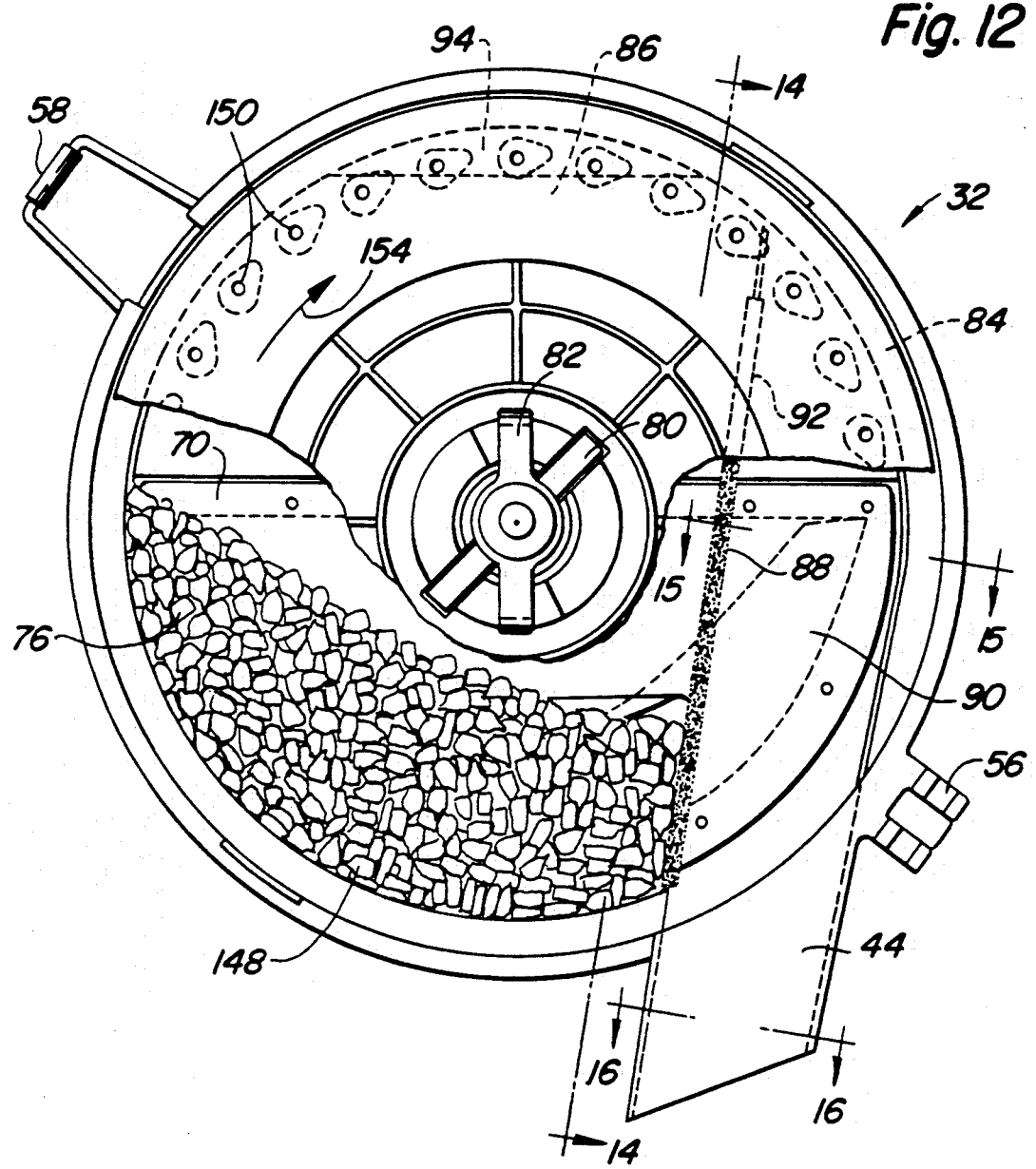
FIG. 12 is a front view of a portion of the vacuum seed meter of FIG. 3 showing a seed mass therein together with individual seeds which are picked up from the seed mass and then released from the seed disk for discharge from the meter.
Figure 15:
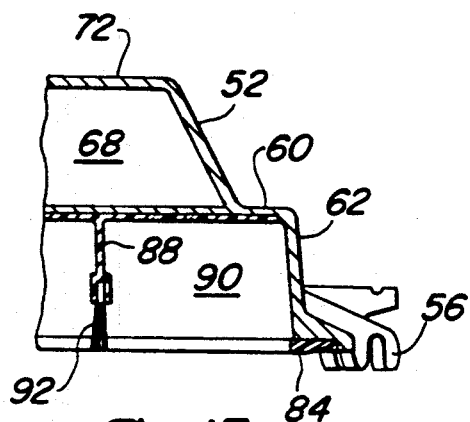
FIG. 15 is a sectional view of the portion of the vacuum seed meter shown in FIG. 12 taken along the line 15—15 thereof.
Figure 16:
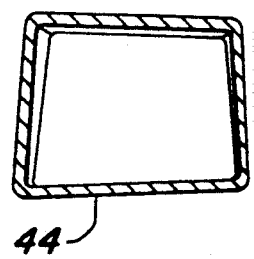
FIG. 16 is a sectional view of the portion of the vacuum seed meter shown in FIG. 12 taken along the line 16—16 thereof.
Figure 13:
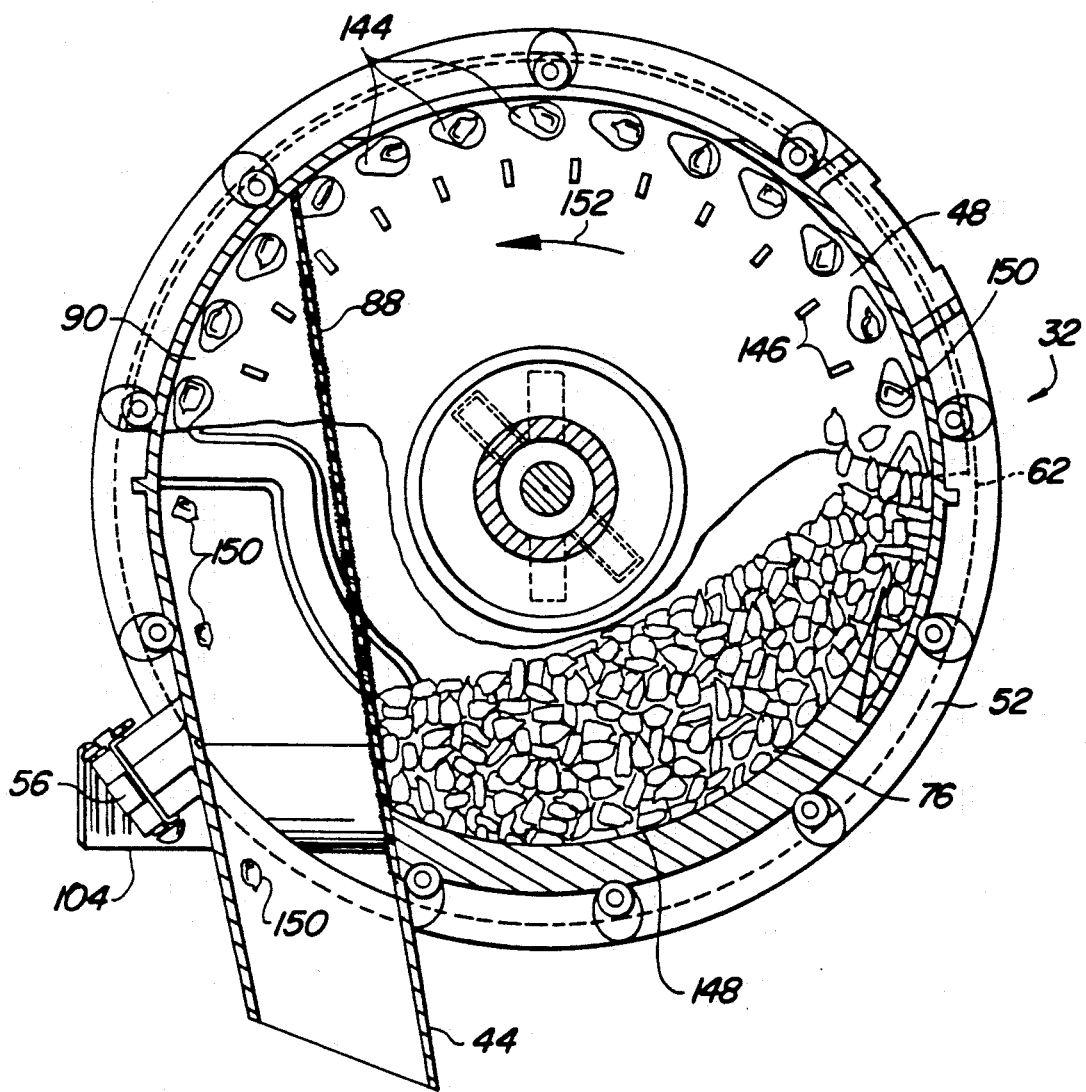
FIG. 13 is a sectional view of the vacuum seed meter of FIG. 3 taken along the line 13—13 of FIG. 8 and showing a seed mass therein in conjunction with the seed disk.
Figure 14:
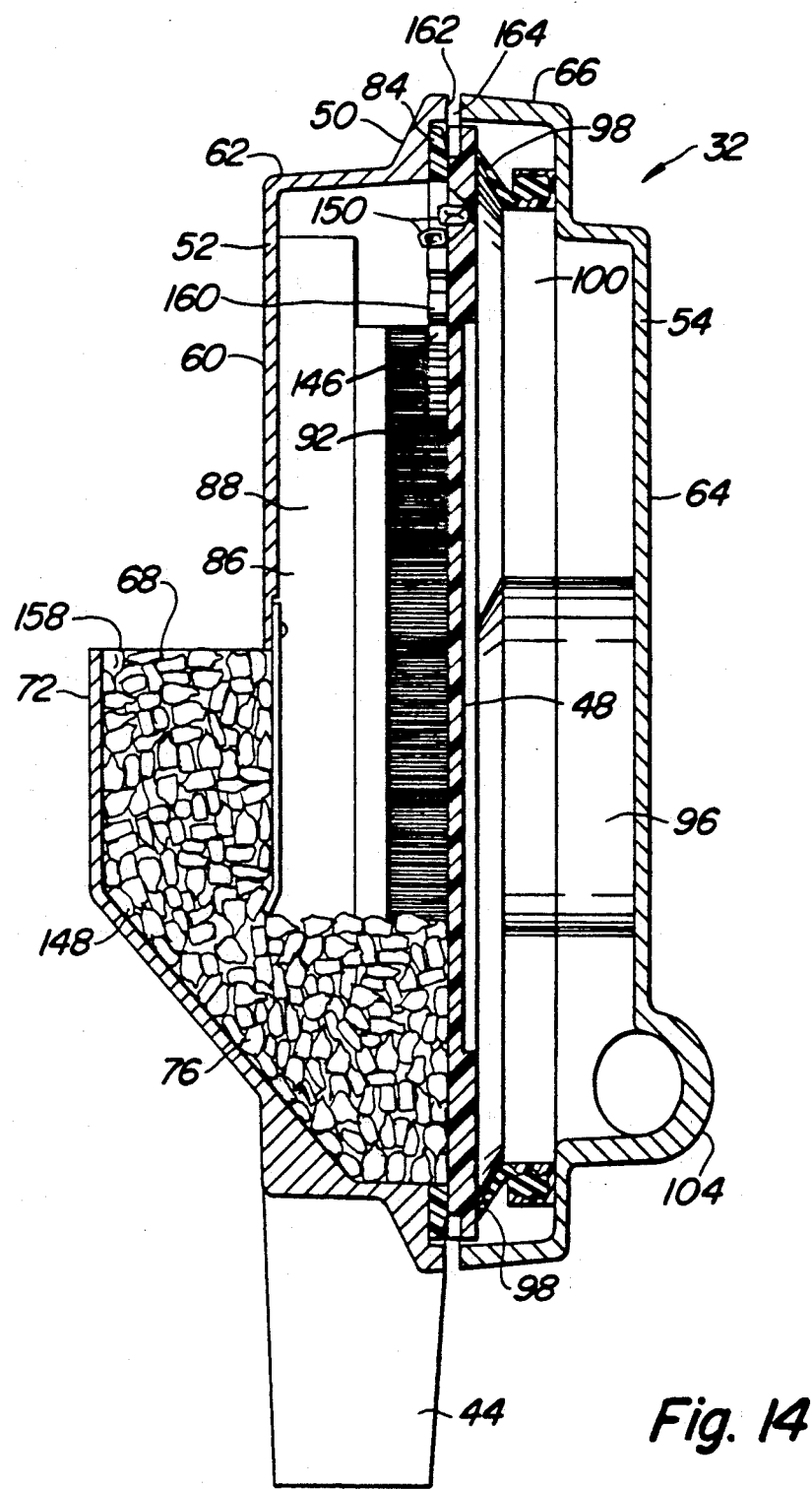
FIG. 14 is a sectional view of the vacuum seed meter of FIG. 3 taken along the line 14—14 of FIG. 12.

FIG. 3 depicts the seed hopper 22 in conjunction with the vacuum seed meter 32. The vacuum seed meter 32 is depicted in an opened position in conjunction with a seed disk 48 removably located within the interior of the vacuum seed meter 32. The vacuum seed meter 32 and various portions thereof is also shown in FIGS. 4-16, some of which show the vacuum seed meter 32 in the opened position as in the case of FIG. 3 and some of which show the vacuum seed meter 32 in the closed position. FIGS. 12-14 show the vacuum seed meter 32 with a mass of seeds therein.

The vacuum seed meter 32 has a generally cylindrical housing 50 which is comprised of a first half shell 52 and a second half shell 54. The first and second half shells 52 and 54 are of somewhat similar configuration and are coupled together by a hinge assembly 56. A clasp assembly 58 which is mounted on opposite sides of the first and second half shells 52 and 54 from the hinge assembly 56 is used to hold the half shells 52 and 54 together in a closed position.

The first half shell 52 is comprised of a generally disk-shaped back wall 60 and a generally cylindrical sidewall 62 joined to the back wall 60 at the outer periphery of the back wall 60. Likewise, the second half shell 54 is comprised of a generally disk-shaped back wall 64 and a generally cylindrical side wall 66 which is coupled to the outer periphery of the back wall 64. The first half shell 52 is mounted at the bottom of the seed hopper 22 so that seeds contained within the hopper 22 flow by gravity into a seed chute 68 at the back of the first half shell 52.

A seed baffle insert 70 which is of generally planar configuration and which is mounted on a portion of the back wall 60 forms the seed chute 68 together with an outer wall 72 (shown in FIGS. 10, 11 and 14) of the first half shell 52. The seed baffle insert 70 also forms an opening 74 at the bottom of the first half shell 52 through which the seed chute 68 communicates with a seed reservoir 76 at the inside of the first half shell 52. The configuration of the seed baffle insert 70 and the opening 74 formed thereby control the seed level in the seed reservoir 76. The configuration of the seed baffle insert 70 or the size of the opening 74 or both can be changed if desired to vary the seed flow characteristics. This can be accomplished simply by replacing the seed baffle insert 70 with one of different configurations while the rest of the vacuum seed meter 32 remains the same. The seed reservoir 76 extends between the seed baffle insert 70 and the seed disk 48 when the seed disk 48 is mounted within the housing 50 comprised of the first and second half shells 52 and 54. By action of gravity seeds within the seed hopper 22 flow downwardly from the hopper 22 into the seed chute 68 at the back of the first half shell 52. From the seed chute 68 the seeds flow through the opening 74 and into the seed reservoir 76. The resulting seed mass is shown in FIG. 12.

The seed disk 48 is releasably and rotatably mounted within the cylindrical housing 50 by being mounted on a hub assembly 78 at the center of the first half shell 52. The hub assembly 78 includes a rotatably mounted disk attaching mechanism 80 which has a handle 82. Rotation of the handle 82 locks the seed disk 48 to and unlocks the disk 48 from the hub assembly 78 in a manner which is shown and described in detail in a copending application of Webber, Serial No. 546831, filed Oct. 31, 1983 and commonly assigned with the present application. When the seed disk 48 is mounted on the hub assembly 78, the outer periphery of the disk 48 is disposed in close proximity to a generally ring-shaped seed barrier 84 mounted on the generally cylindrical sidewall 62 of the first half shell 52. Accordingly, the seed disk 48 essentially closes off the open interior of the first half shell 52 so as to form a first or seed chamber 86 which includes the seed reservoir 76 at the bottom thereof.

A separating wall 88 extending across the inside of the first half shell 52 between opposite portions of the sidewall 62 of the first half shell 52 defines a separate seed discharge chamber 90 within the first or seed chamber 86. As described hereafter individual seeds from the seed reservoir 76 at the bottom of the first half shell 52 are picked up by the seed disk 48 where they are held in place by the effects of vacuum from a vacuum source coupled to the interior of the second half shell 54. The individual seeds remain attached to the seed disk 48 until they reach the seed discharge chamber 90 which is isolated from the vacuum within the second half shell 54. This releases the seeds from the seed disk 48, whereupon the individual seeds fall through the seed discharge chute 44 into the furrow in the ground below. The seed discharge chute 44 is coupled to the first half shell 52 so as to communicate with the interior of the first half shell 52 at the bottom of the seed discharge chamber 90. An elongated seed retainer brush 92 is mounted on the top of and extends along the length of the separating wall 88 so as to be disposed adjacent the seed disk 48. As described hereafter the seed retainer brush 92 combines with the separating wall 88 to form a substantially complete barrier between the back wall 60 and the seed disk 48 while at the same time permitting fins which may be located on the surface of the seed disk 48 to pass through such barrier.

Figure 11:
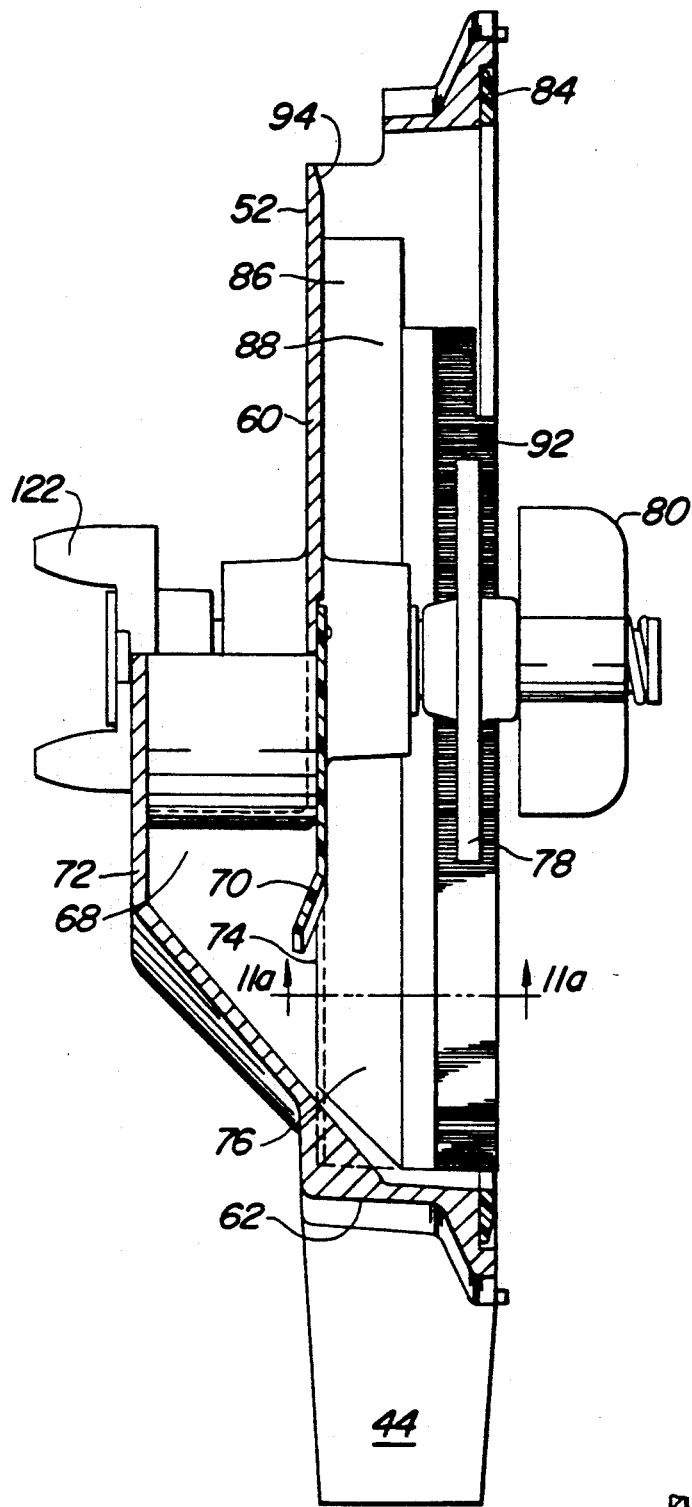
FIG. 11 is a sectional view of the vacuum seed meter of FIG. 3 taken along the line 11—11 of FIG. 9.
Figure 11A:
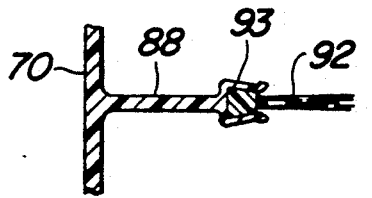
FIG. 11a is a sectional view of a portion of the vacuum seed meter of FIG. 3 taken along the line 11a—11a of FIG. 11.

As shown in FIGS. 11 and 11a the separating wall 88 may be formed integrally with the seed baffle insert 70 so that the wall 88 and the insert 70 are installed in the meter 32 as a single element. The upper edge of the separating wall 88 terminates in an open channel 93 extending along the length of the wall 88 and receiving the base of the seed retainer brush 92 therein. The open channel 93 facilitates replacement of the brush 92.

An air inlet opening 94 formed in the back wall 60 of the first half shell 52 at the top of the first half shell 52 permits air to flow into the first or seed chamber 86 at the interior of the first half shell 52 from outside of the vacuum seed meter 32. A small amount of such air flow is needed to assure atmospheric pressure in chamber 86 so that the vacuum within the second half shell 54 will hold the individual seeds in place as they are picked up by the seed disk 48.

Figure 3A:
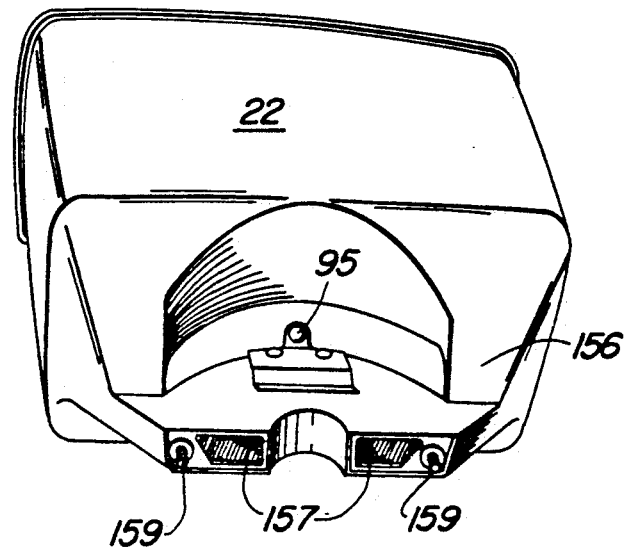
FIG. 3a is a lower perspective view of the seed hopper of FIG. 3 with the vacuum seed meter removed therefrom.

The opening 94 also receives a clip 95 therethrough to help support the meter 32 on the hopper 22. As shown in FIG. 3a the clip 95 is mounted at the base of the hopper 22. The bottom of the hopper 22 is concave in the region just above the meter 32 to permit air flow to the opening 94 while protecting the meter 32 and the opening 94 from the elements.

The second half shell 54 has a second or vacuum chamber 96 at the interior thereof. The second or vacuum chamber 96 is defined by the back wall 64 in conjunction with a vacuum seal 98 and a vacuum seal retainer 100 extending upwardly from the back wall 64 and mounting the vacuum seal 98 thereon. The vacuum seal 98 and the vacuum seal retainer 100 are disposed adjacent and inside of the generally cylindrical sidewall 66 of the second half shell 54 around most of the perimeter of the sidewall 66. However, at a portion of the second half shell 54 adjacent the hinge assembly 56, the seal 98 and the seal retainer 100 extend across the second half shell 54 in a manner so as to define a non-vacuum chamber 102 within the second half shell 54 and adjacent the second or vacuum chamber 96. A vacuum port 104 formed in the back wall 64 of the second half shell 54 terminates in an opening 106 which communicates with the second or vacuum chamber 96 within the second half shell 54.

The vacuum port 104 is coupled to a vacuum source which in this instance comprises a centrifugal blower 107 mounted on the main frame 12 as shown in FIG. 1. A manifold 109 coupled to the inlet side of the centrifugal blower 107 is coupled to each of the vacuum seed meter 32 mounted on the planter implement 10 by lengths of flexible hose (not shown) which couple to the vacuum ports 104. This enables the low pressure of the blower 107 to be communicated through the vacuum port 104 and the opening 106 to the vacuum chamber 96.

The vacuum chamber 96 applies the low pressure to a major portion of the seed disk 48. The portion of the seed disk 48 which is not exposed to the low pressure is that portion residing between the seed discharge chamber 90 within the first half shell 52 and the non-vacuum chamber 102 within the second half shell 54. The particular configuration of the vacuum seal 98 and the vacuum seal retainer 100 prevents the reduced pressure within the vacuum chamber 96 from communicating with the non-vacuum chamber 102. The absence of the reduced air pressure of the vacuum source at he portion of the seed disk 48 adjacent the non-vacuum chamber 102 provides for release and discharge of the individual seeds on the seed disk 48 within the seed discharge chamber 90.

Figure 4:
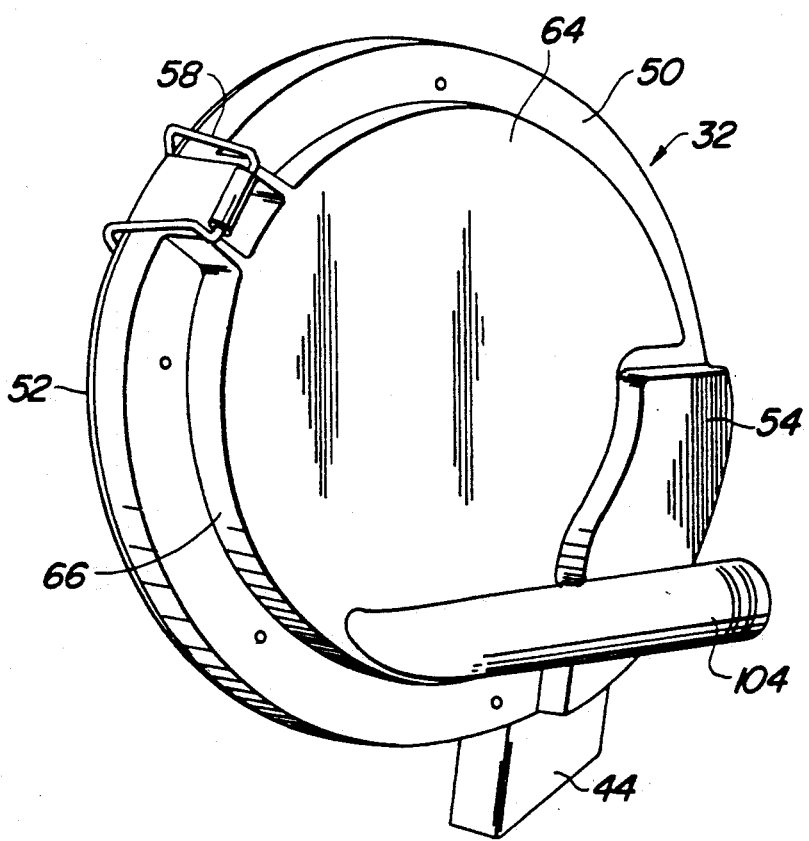
FIG. 4 is a left front perspective view of the vacuum seed meter of FIG. 3.

As seen in FIG. 4 the vacuum port 104 terminates in a hollow tube at the exterior of the second half shell 54 of the cylindrical housing 50. The vacuum port 104 is located near the bottom of the housing 50 to suck out debris and prevent accumulation of the debris in the vacuum chamber 96. This hollow tube portion of the vacuum port 104 is coupled to the vacuum source by a length of flexible tubing and the manifold 109 as previously noted.

Figure 9:
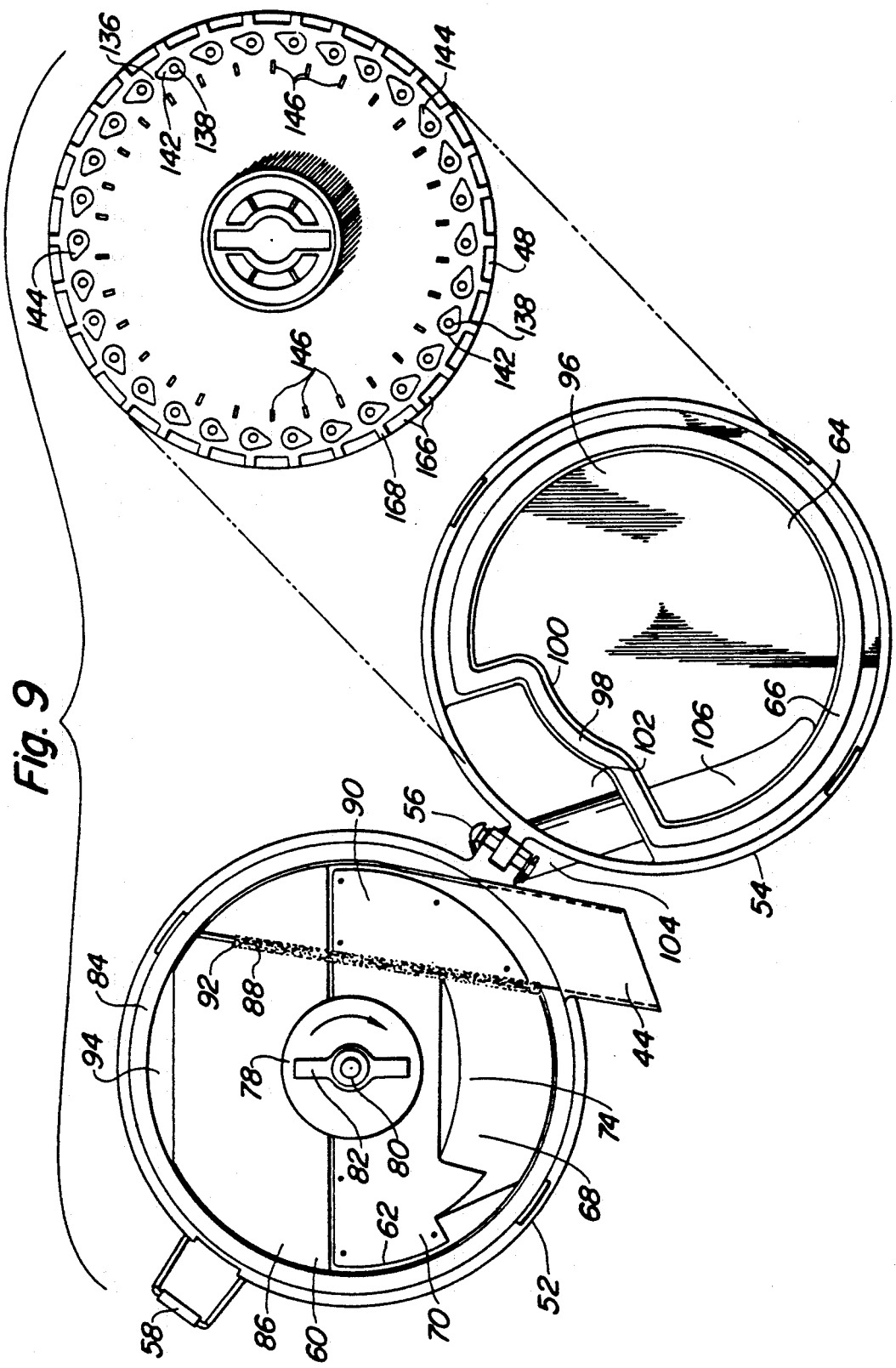
FIG. 9 is a front view of the vacuum seed meter of FIG. 3 showing the meter disposed in an open position in conjunction with the seed disk which is removably mounted on the inside thereof.
Figure 10:
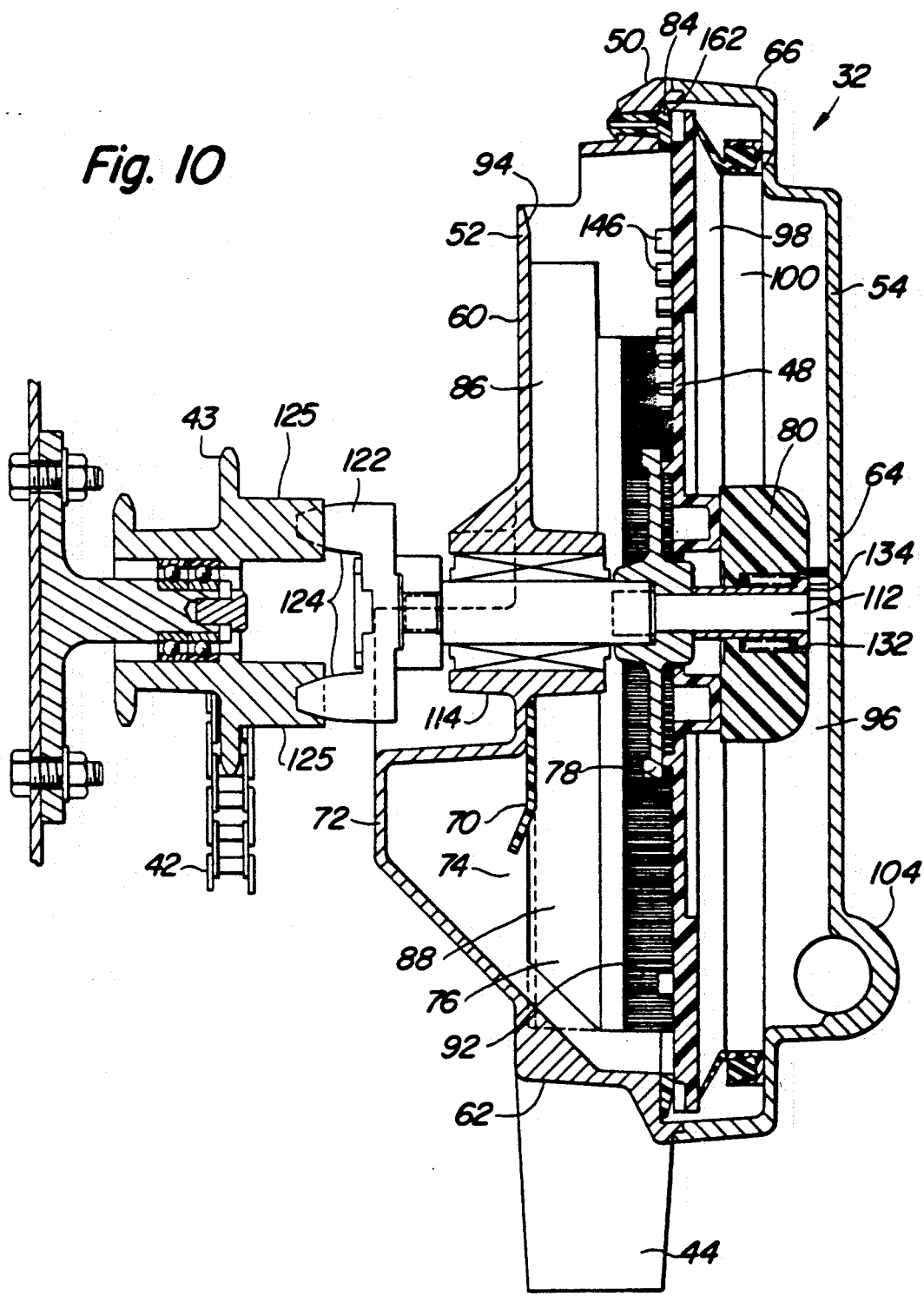
FIG. 10 is a sectional view of the vacuum seed meter of FIG. 3 taken along the line 10—10 of FIG. 8.

The hub assembly 78 which is shown in FIGS. 3, 9 and 12 is shown in cross section in FIG. 10 and in some detail in FIG. 11. As best seen in FIG. 10 the hub assembly 78 includes a hub 110 of generally circular configuration mounted on a shaft 112. The shaft 112 extends through a hollow cylindrical portion 114 within the back wall 60 of the first half shell 52 where it is rotatably mounted by opposite bearing arrangements 116 and 118. The hub 110 mounts the seed disk 48 thereon.

As previously noted in connection with FIG. 2, the seed disk 48 within the vacuum seed meter 32 is rotatably driven by the common shaft 38 behind the main frame 12. The chain sprocket 40 and the chain 42 couple the shaft 38 to drive the rear chain sprocket 43. The rear chain sprocket 43 is in turn coupled to the shaft 112 shown in FIG. 10 by an automatically engageable and disengageable drive coupler mechanism 122 which is shown in FIGS. 5–8 and 11 as well as in FIG. 10 and which is shown and described in greater detail in a copending application of Swales et al, Ser. No. 546,832, filed Oct. 31, 1983 and commonly assigned with the present application. As described in said copending application Ser. No. 546,832, the drive coupler mechanism 122 includes opposite lugs 124 which are commonly mounted so as to be rotatable through approximately 180° against spring resistance. This allows the rear chain sprocket 43 to be coupled to and uncoupled from the lugs 124 via lugs 125 thereon without manual assistance from the operator. With lugs 125 on the rear chain sprocket 43 engaging the lugs 124, the shaft 112 shown in FIG. 10 is rotated so as to rotatably drive the seed disk 48 via the hub 110.

As previously noted, the hub assembly 78 includes the disk attaching mechanism 80 and the handle 82. As seen in FIG. 3 the center of the seed disk 48 is provided with an elongated slot 126 therein disposed between an opposite pair of semicircular ramps 128 and 130 of gradually increasing height. As seen in FIG. 3 as well as in FIGS. 9 and 12 the handle 82 is of elongated configuration and of appropriate size so as to pass through the elongated slot 126 of the seed disk 48 as the seed disk 48 is mounted on the hub assembly 78. When the seed disk 48 is so mounted, rotation of the handle 82 causes the handle to ride up on the ramps 128 and 130 against the resistance of a spring 132 shown in FIG. 10. The spring 132 extends between the hollow interior of the handle 82 and a keeper 134 mounted on the end of the shaft 112. When the handle 82 is rotated to the highest portions of the ramps 128 and 130, it is retained in this position within detents so as to hold the seed disk 48 locked on the hub 110. The seed disk attaching mechanism 80 is shown and described in greater detail in a copending application of Webber, Ser. No. 546,831, filed Oct. 31, 1983 and commonly assigned with the present application.

When the seed disk 48 is mounted on the hub 110 in the manner just described, the second half shell 54 must be closed over the seed disk 48 and the first half shell 52 before the vacuum seed meter 32 can be operated. The hinge assembly 56 permits rotation of the second half shell 54 relative to the first half shell 52 to close the second half shell 54 over the seed disk 48 and the first half shell 52. The second half shell 54 is then latched in the closed position by securing the clasp assembly 58. It is desirable that the first and second half shells 52 and 54 be flexibly hinged so that they can fit together in sealing relation in the face of such things as manufacturing tolerances. The hinge assembly 56 permits such flexibility through use of a spring-loaded hinge pin. The hinge assembly 56 is shown and described in greater detail in a copending application of Ankum et al, Ser. No. 546,833, filed Oct. 31, 1983 and commonly assigned with the present application.

As previously discussed in connection with FIG. 3 the vacuum seal 98 is mounted on the vacuum seal retainer 100 within the second half shell 54. The vacuum seal 98 is generally V-shaped in cross section as shown in FIGS. 10 and 14 and bears against the outer periphery of the seed disk to seal the seed disk 48 to the vacuum chamber 96 formed within the second half shell 54. The portion of the vacuum seal 98 which resides against the seed disk 48 forms a lip that is drawn against the seed disk 48 by the vacuum, enabling the seal 98 to function as a vacuum cutoff. The vacuum seal 98 is shown and described in greater detail in a copending application of Webber et al, Ser. No. 546,830, filed Oct. 31, 1983 and commonly assigned with the present application.

FIG. 9 depicts a first side 136 of the seed disk 48 which faces the seed chamber 86 formed by the inside of the first half shell 52 in conjunction with the seed disk 48. As seen in FIG. 9 the seed disk 48 has a circumferential row of apertures 138 arranged adjacent the outer periphery of the disk 48. Each of the apertures 138 extends through the entire thickness of the seed disk 48 between the first side 136 and an opposite second side 140 of the seed disk 48. Extending into the seed disk 48 from the first side 136 thereof are a plurality of recesses 142. Each of the recesses 142 is associated with a different one of the apertures 138 such that the aperture 138 is located at the bottom of the recess 142. Each recess 142 in combination with the associated aperture 138 forms a different seed cell 144 in the seed disk 48. The various seed cells 144 in the seed disk 48 which are described in detail hereafter in connection with FIGS. 18–22 are operative in conjunction with the vacuum to agitate, mechanically accelerate, position and retain seeds from a mass of seeds located in the seed reservoir 76 as the seed disk 48 is rotated through the seed reservoir 76.

As also shown in FIG. 9 the first side 136 of the seed disk 48 may be provided with a circumferential row of fins 146. Each of the fins 146 is located radially inwardly from and adjacent a different one of the seed cells 144. The fins 146 are shown and described in greater detail hereafter in connection with FIGS. 18–22. While the seed cells 144 provide considerable agitation of the seeds as the seed disk 48 is rotated through a mass of seeds in the seed reservoir 76, the fins 146 are provided on the seed disk 48 in the present example to provide additional agitation. Generally the fewer seed cells 144 there are on the seed disk 48 the less is the agitation provided thereby and therefore the greater the likelihood that additional items such as the fins 146 may be needed to provide the necessary agitation. Also, if a large range of operating speeds is required, fins are advantageous since they permit the use of relatively shallow seed cells at low speeds without the problem of multiple seeds.

FIGS. 12–14 depict a mass of seeds within the seed reservoir 76 in the vacuum seed meter 32. FIG. 13 depicts such a seed mass 148 in conjunction with the first side 136 of the seed disk 40. FIG. 12 is a view in the opposite direction from that of FIG. 13 which depicts the seed mass 148 and a plurality of individual seeds 150 therefrom as they are picked up by the seed cells 144 of the seed disk 48 and carried over to the seed discharge chamber 90 for release from the seed disk 48. FIG. 14 is a cross-sectional view through the vacuum seed meter 32 showing the seed mass 148 as it resides within the seed reservoir 76.

As previously noted in connection with FIGS. 10 and 14 the vacuum seal 98 which resides against the second side 140 of the seed disk 48 exposes the second side 140 of the seed disk 48 to the full effects of the vacuum from the vacuum source. The seed disk 48 is essentially sealed to the hub 110 so that the vacuum is confined to communicating with the first side 136 of the seed disk 48 substantially exclusively through the apertures 138 in the seed disk 48. This enables the individual seeds 150 to be held within the seed cells 144 in the first side 136 of the seed disk 48 as the seeds 150 are agitated and then mechanically accelerated by the seed cells 144 as they pass through the seed mass 148. Each of the seed cells 144 is configured and dimensioned so as to pick and retain therein one and only one seed 150 as the seed cell 144 moves upwardly out of the seed mass 148. The single seed 150 is retained by pressure differential within the seed cell 144 until the seed disk 48 has rotated far enough for the seed cell 144 to enter the seed discharge chamber 90. At that point the effects of the vacuum communicating through the associated aperture 138 and holding the seed 150 within the seed cell 144 are terminated and the seed 150 is released so as to fall out of the seed cell 144 under the urging of gravity. This is illustrated in FIGS. 12 and 13.

Each of the apertures 138 is chamfered on the second or vacuum side 140 of the seed disk 48. The increasing diameter of each aperture 138 between the bottom of the seed cell end thereof and the opposite end at the side 140 of the seed disk 48 permits debris such as seed chips, broken seeds and dirt within the seed chamber 86 to be pulled through the aperture 138 and out of the seed meter 32 via the vacuum port 104.

In FIG. 13 the seed disk 48 is rotating in a counterclockwise direction as represented by an arrow 152. As the individual seed cells 144 adjacent the outer periphery of the seed disk 48 move through the seed mass 148, the seed cells 144 agitate the individual seeds 150 with each of the seed cells 144 thereafter mechanically accelerating a small group of the seeds 150 through the seed mass 148. This results in at least one of the seeds 150 being picked up and retained within the seed cell 144 by vacuum as the seed cell 144 moves through the seed mass 148. Additional seeds may become temporarily attached to the seed disk 48 in the region of the seed cell 144 as the cell 144 is moved through the seed mass 148. However as the seed cell 144 reaches and then rises above the surface of the seed mass 148, such additional seeds fall away from the seed cell 144 and back onto the seed mass 144 so that only a single seed 150 remains within the seed cell 144. This is due in part to the shape and size of the seed cells 144 which is discussed hereafter in connection with FIGS. 18-22 and which is configured so that only one seed at a time may reside over the aperture 138 at the bottom of the cell 144. It is also due to the fact that the vacuum which is communicated to the interior of the vacuum seed meter 32 is relatively low and involves a relatively small pressure differential.

Thus, the vacuum need only be strong enough to hold a single seed 150 within each seed cell 144 as the seed cell 144 moves out of the seed mass 148 and eventually into the seed discharge chamber 90. The vacuum is not so strong that two or more of the seeds 150 are held within a given seed cell 144. The use of a relatively low level of vacuum is made possible largely by the design of the seed cells 144. The individual seed cells 144 are configured and dimensioned so as to agitate and mechanically accelerate the seeds and then capture a seed 150 therein without the need for a strong vacuum. In the present example the vacuum source need provide a pressure differential of no greater than about 2.0 KPa within the vacuum chamber 96 at the second side 140 of the seed disk 48.

FIG. 13 shows the manner in which the seed cells 144 of the seed disk 48 move through the seed mass 148, capture a single seed 150 within each seed cell 144 and thereafter carry the seed to the seed discharge chamber 90. After each of the seed cells 144 passes through the opening at the top of the separating wall 88 and moves opposite the chamber 102, the force of the vacuum which is communicated to the seed 150 via the aperture 138 at the bottom of the seed cell 144 is terminated so as to release the seed 150 from the seed cell 144. This allows the seed 150 to fall from the seed cell 144 under the force of gravity. The released seed 150 falls downwardly through the seed discharge chute 44 into the furrow in the ground below. FIG. 12 which is a view in the opposite direction from that of FIG. 13 also shows the path of the individual seeds 150 as they are picked up from the seed mass 148 and carried over to the seed discharge chamber 90 for release from the seed cells 144 within the seed disk 48. In the view of FIG. 12 the seed disk 48 which is not shown therein rotates in a clockwise direction as represented by an arrow 154. The arrow 154 also represents the direction of rotation of the hub assembly 78 on which the seed disk 48 is mounted.

Figure 8:
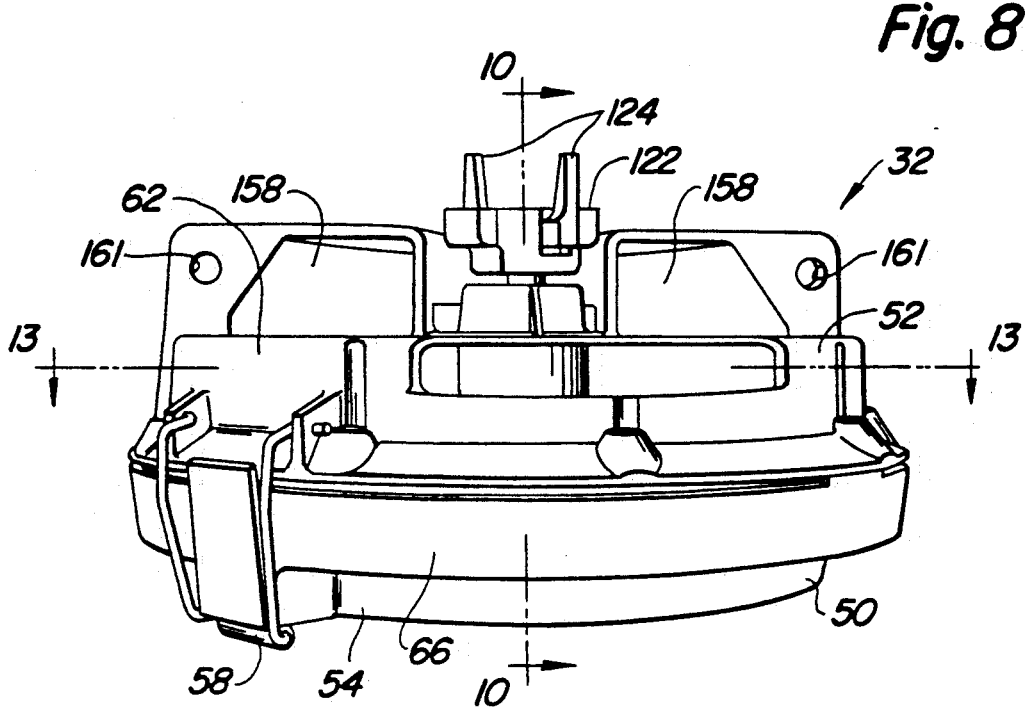
FIG. 8 is a top view of the vacuum seed meter of FIG. 3.
Figure 5:
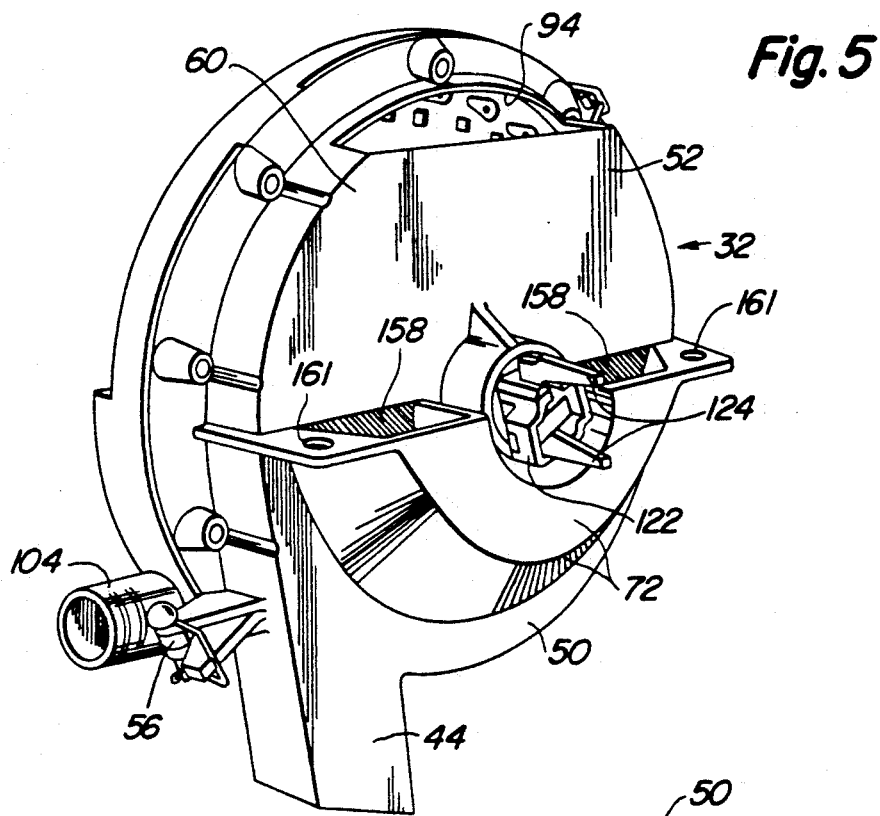
FIG. 5 is a right rear perspective view of the meter of FIG. 3.
Figure 6:
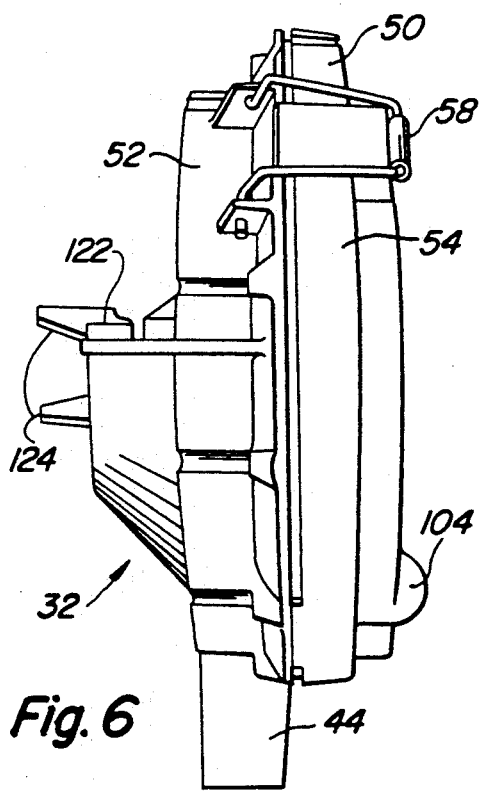
FIG. 6 is a left side view of the vacuum seed meter of FIG. 3.
Figure 7:
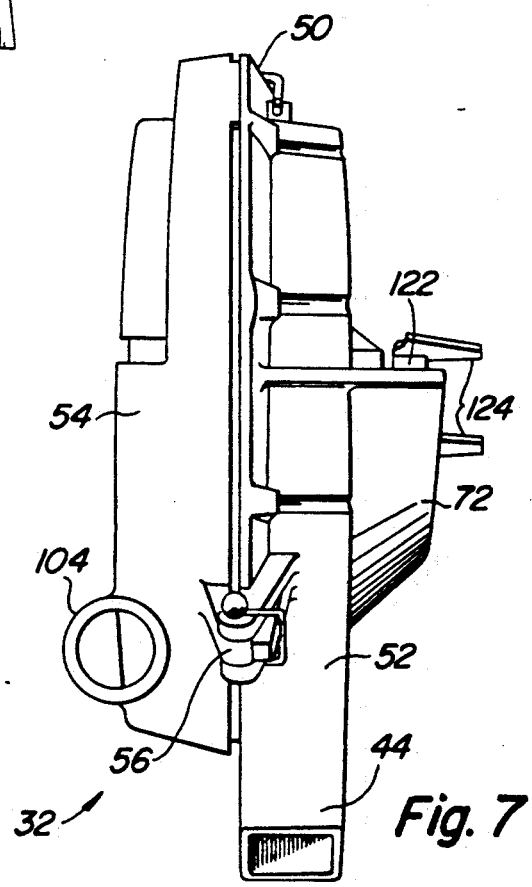
FIG. 7 is a right side view of the vacuum seed meter of FIG. 3.

Referring again to FIG. 3a it will be seen that the seed hopper 22 has a bottom portion 156 which converges down onto the first half shell 52 of the vacuum seed meter 32. Seeds within the seed hopper 22 flow into the converging bottom portion 156 where they pass through a pair of openings 157 at the bottom portion 156 and then through a pair of mating apertures 158 in the housing 50 of the seed meter 32. The apertures 158 are in the top of the outer wall 72 as seen in FIGS. 5, 8 and 14. The apertures 158 define the top of the seed chute 68. The openings 157 provide good seed flow and hopper emptying, and with the configuration of the mating apertures 158 in the seed meter provide a convenient location for the meter drive without need for elaborate drive seals.

The seed meter 32 is easily coupled to aid removal from the bottom portion 156 of the seed hopper 22. As shown in FIG. 3a a pair of threaded shafts 159 on the outside of the bottom portion 156 adjacent the openings 157 extend through openings 161 (shown in FIG. 8) in the first half shell 52 and receive threaded nuts thereon to mount the seed meter 32 on the hopper 22. As previously noted the clip 95 is received in the opening 94 at the top of the seed chamber 86 to help support the seed meter 32 on the hopper 22.

As the seeds flow through the apertures 158 and down into the seed inlet chute 68 they converge into a single mass which flows through the opening 74 and into the seed reservoir 76 formed by the bottom of the first or seed chamber 86 on the inside of the first half shell 52. The configuration of the seed inlet chute 68 at the very center thereof between the apertures 158 is shown in FIG. 10. As shown in FIG. 10 the seed baffle insert 70 is mounted on the inside of the lower extremity of the back wall 60 of the first half shell 52 and defines the opening 74 through which the seeds flow into the seed reservoir 76.

As previously noted, the seed discharge chamber 90 is separated from the first or seed chamber 86 within the first half shell 52 by the separating wall 88 together with the seed retainer brush 92. As shown in FIGS. 10, 11 and 14 the seed retainer brush 92 extends from the top of the separating wall 88 into contact with the first side 136 of the seed disk 48 to complete the seed barrier. The seed retainer brush 92 prevents seeds from the seed mass 148 from spilling into the seed discharge chamber 90. The upper end of the seed retainer brush 92 has a notch 160 therein along a small portion thereof. The notch 160 within the seed retainer brush 92 forms a small space between the brush 92 and the first side 136 of the seed disk 48 as best shown in FIG. 14. This small space prevents interference with the seeds 150 by the brush 92 as the seeds 150 within the seed cell 144 are moved past the seed retainer brush 92 into the seed discharge chamber 90. At the same time the seed retainer brush 92 is sufficiently flexible so as to readily pass the fins 146 thereby in the event the fins 146 are higher than the space formed by the notch 146.

It was previously noted that the upper edge of the generally cylindrical sidewall 62 of the first half shell 52 has a cleanout and seed sealing member in the form of the barrier 84 mounted thereon. As shown in FIGS. 10 and 14 the barrier 84 is disposed adjacent and forms a small space 162 with the first side 136 of the seed disk 48. The barrier 84 which is shown and described in greater detail in a copending application of Olson, Ser. No. 548,829, filed Oct. 31, 1983 and commonly assigned with the present application, slopes slightly away from the first side 136 of the seed disk 48 in a radially outward direction to encourage seed chips, broken seeds, dirt and other debris which may collect within the first or seed chamber 86 to exit from the housing 50. Debris which passes through the space 162 subsequently passes through slots 164 formed between the mating first and second half shells 52 and 54. Outward expulsion of the debris through the space 162 is encouraged by a succession of cavities and radial ribs at the outer edge of the seed disk 48. As shown in FIG. 9 the outer edge of the first side 136 of the seed disk 48 is provided with a succession of cavities 166 disposed between and forming ribs 168 therebetween.

Figure 17:
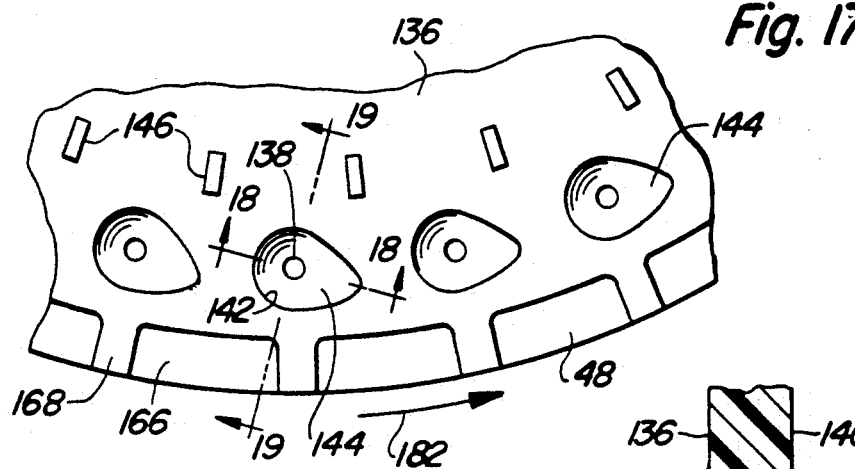
FIG. 17 is a plan view of a portion of the outer periphery of the seed disk showing three of the seed cells therein.
Figure 19:
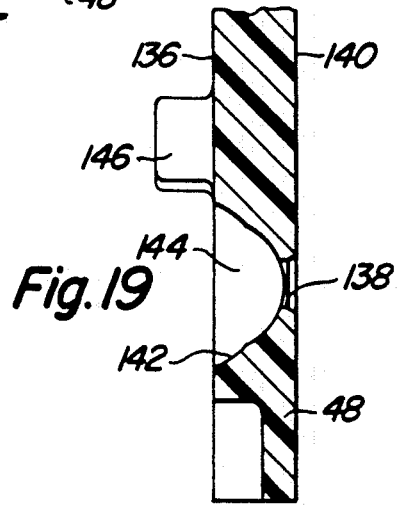
FIG. 19 is a sectional view of the portion of the outer periphery of the seed disk of FIG. 17 taken the line 19—19 thereof.
Figure 18:
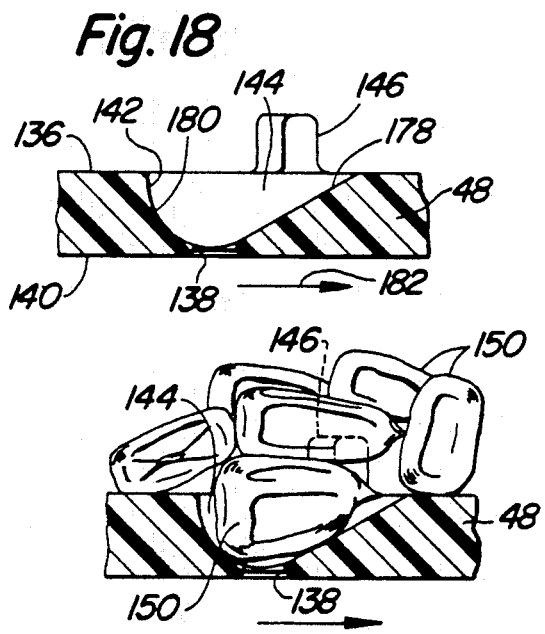
FIG. 18 is a sectional view of part of the portion of the outer periphery of the seed disk of FIG. 17 taken along the line 18—18 thereof.

The seed cells 144 in the first side 136 of the seed disk 48 are shown in greater detail in FIGS. 17-22 together with the fins 146. FIG. 17 depicts a portion of the outer periphery of the seed disk 48 including three of the seed cells 144 and three of the fins 146. The outer edge of the seed disk 48 is provided with an alternating succession of the cavities 166 and the radial ribs 168 as previously noted. FIGS. 18 and 19 comprise two different sectional views of one of the seed cells 144 of FIG. 17. As shown in FIG. 18 the seed cell 144 has a front wall 178 which has a given slope profile as it descends from the first surface 136 of the seed disk 48 to the bottom of the recess 142 adjacent the aperture 138. The seed cell 144 has a rear wall 180 opposite the front wall 78 which has a slope profile between the first side 136 and the aperture 138 that is considerably greater than the slope profile of the front wall 178. It has been found that by making the rear wall 180 considerably steeper than the front wall 178, the seed cells 144 provide adequate agitation and mechanical acceleration of the seeds without the need for additional complex devices to enhance these actions. The fins 146 comprise a relatively simple and economical addition which enhances the agitation of the seeds and which may not be needed for many applications. The seed disk 48 moves in a direction shown by arrows 182 in FIGS. 17 and 18.

It will be observed from FIG. 17 that the seed cells 144 are generally teardrop-shaped in outline. Consequently, the cross-sectional shape thereof in a direction normal to the sectional view of FIG. 18 is relatively symmetrical as shown in FIG. 19.

Figure 20:
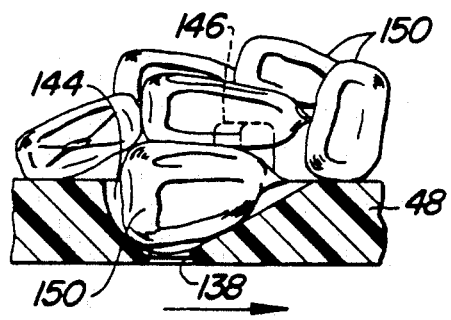
FIG. 20 is a sectional view like that of FIG. 18 but with a plurality of seeds in the region of the seed cell.
Figure 22:
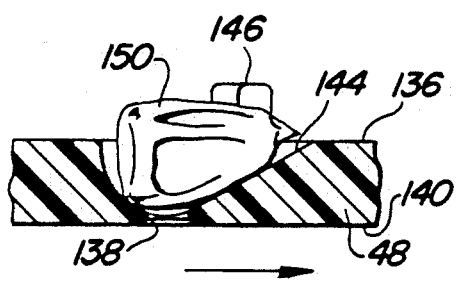
FIG. 22 is a sectional view like that of FIG. 18 but with a single seed within the seed cell.
Figure 21:
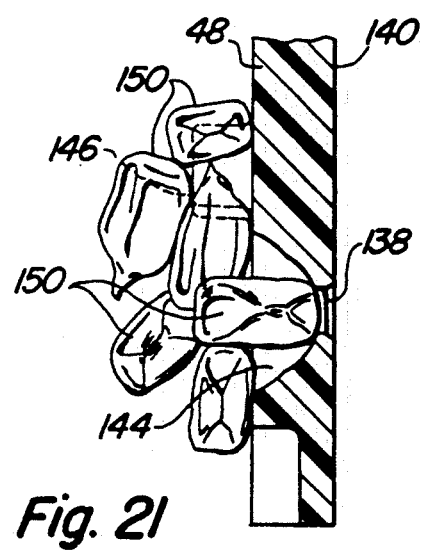
FIG. 21 is a sectional view like that of FIG. 19 but with a plurality of seeds in the region of the seed cell.

It has already been noted that the seed cells 144 have been found to provide adequate agitation and mechanical acceleration of seeds from the seed mass 148, particularly when aided by the presence of the fins 146. The shape and size of the seed cells 144 also plays an important role in eliminating all but one seed 150 from the cell 144 and thereafter holding that single seed within the cell using a low pressure differential vacuum. FIGS. 20 and 21 are sectional views similar to the view of FIGS. 18 and 19 respectively except that they show the seed cell 144 as it moves through the seed mass 148 and is surrounded by a plurality of the seeds 150. As shown in FIG. 20 the length of the seed cell 144 is great enough to ensure that one of the seeds 150 is captured therein. At the same time, the length is small enough so that other seeds cannot also reside within the seed cell 144. As shown in FIG. 21 the width of the seed cell 144 is adequate to accommodate a single seed 150 but not so great that other seeds can also be accommodated within the seed cell 144. It has been found that by making the width relatively small, the chances of seed doubling are greatly reduced. The positioning of the aperture 138 relative to the rear wall of the cell is also important in minimizing the chances of seed doubling. While the depth of the seed cell 144 is great enough to provide the necessary agitation, mechanical acceleration and eventual seed capture, the depth is not so great as to permit other seeds to reside on top of a single seed within the seed cell 144, particularly when the vacuum is communicated through the aperture 138 to the outside of the seed cell 144. As a result, as the seed cell 144 emerges from the seed mass 148 a single seed 150 resides within the seed cell 144 as shown in FIG. 22. The depth of the seed cell 144 is preferably not substantially greater than about half the diameter of the seed 150.

A seed meter is desirably capable of use with a variety of different seed types. For example, a meter should be capable of use with corn, cotton, sorghum, sugar beets, soy beans and sunflower as a minimum, even though not all farms will plant all of these seeds or even the majority of them. Unfortunately different types of seeds vary considerably, not only in size but also in terms of shape and surface texture.

The vacuum seed meter 32 in accordance with the invention is capable of use with many different types of seeds. The only modification required is that the seed disk 48 be changed. This is easily accomplished in the field or elsewhere simply by unlocking the clasp assembly 58, opening the housing 50 and rotating the handle 82 to unlock and permit replacement of the seed disk 48. The seed disks 48 have seed cells 144 which are configured for use with a particular type or types of seed. This insures adequate agitation, mechanical acceleration and capture and retention for each particular type of seeds. The basic design of the seed disk shown in FIG. 9 is suitable for use with corn.

Figure 23:
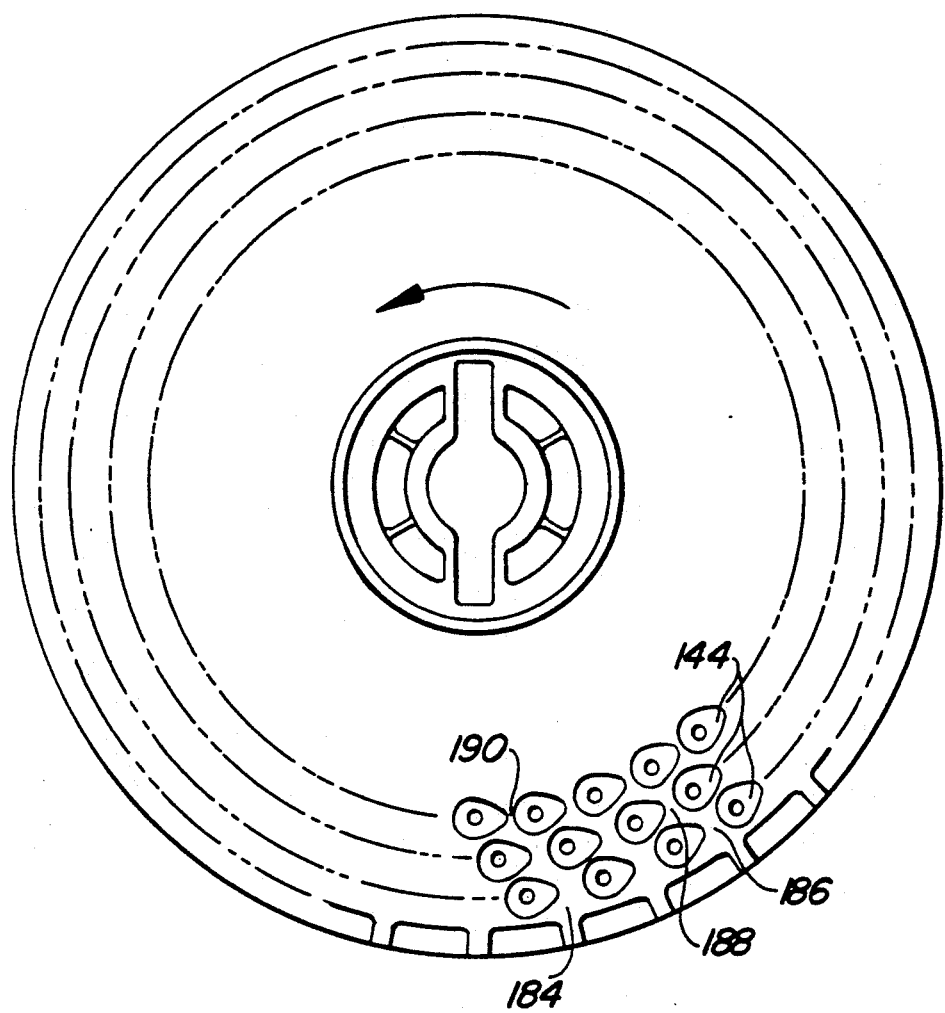
FIG. 23 is a plan view of an alternative arrangement of the seed disk.

The seed disk 48 shown in FIGS. 3 and 9 has a single circumferential row of seed cells 144 with adjoining apertures 138. However, it is possible to use a seed disk having more than one circumferential row of seed cells as shown, for example, by a seed disk 184 in FIG. 23. The seed disk 184 shown in FIG. 23 has three different circumferential rows 186, 188 and 190 of the seed cells 144, but in most other respects is similar to the seed disk 48. The circumferential rows 186, 188 and 190 are generally concentrically arranged within the seed disk 184. The fins 146 in the seed disk 48 are not present in the seed disk 184 although they could be if desired. The presence of the three circumferential rows 186, 188 and 190 of the seed cells 144 has been found to provide adequate seed agitation and mechanical acceleration without the need for fins. The locations of the seed cells 144 within the circumferential rows 186, 188 and 190 thereof are staggered so that a continuous succession of the seed cells 144 enters the seed discharge chamber 90. Accordingly, a seed is discharged from the circumferential row 186 followed by the discharge of a seed from the circumferential row 188 and then the discharge of a seed from the circumferential row 190. In addition the seed cells 144 in the various different rows 186, 188 and 190 are carefully positioned so that the seeds are planted with substantially equal spacing therebetween.

It will be noted that in both the case of the single seed cell row disk 48 and the three seed cell row disk 184, the seed cells are disposed adjacent the outer edge of the disk. This encourages agitation and mechanical acceleration of the seeds. If the row or rows of seed cells are located relatively close to the center of the disk, then agitation and mechanical acceleration are significantly reduced. On the other hand seed cells cannot be placed too close to the outer edge of the disk because of the danger of trapping seeds between the seeds captured in the seed cells and the inner wall of the meter housing.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A seed meter comprising the combination of:
    a housing having a hollow interior;
    a seed disk rotatably mounted within the hollow interior of the housing, the seed disk having at least one row of apertures therein extending through the thickness of the seed disk between opposite first and second sides of the seed disk, the at least one row of apertures being arranged generally circumferentially about the seed disk, the seed disk further having a plurality of recesses therein at the first side thereof, each of the recesses communicating with a different one of the apertures and defining a seed cell, the seed disk dividing the hollow interior of the housing into a first chamber at the first side of the seed disk and a second chamber at the second side of the seed disk;
    means for introducing seeds into the first chamber to provide a mass of seeds therein adjacent the first side of the seed disk and the seed cells therein, each of the seed cells in the seed disk having a longitudinal axis between a front wall and an opposite rear wall thereof which extends generally in a direction of rotation of the seed disk, a length defined by the distance between the front wall and the rear wall at the first side of the seed disk, an opposite pair of side walls between the front wall and the rear wall, and a width which is defined by the distance between the opposite pair of side walls at the first side of the seed disk and which is less than the length, the opposite side walls converging on each other in a direction from the aperture with which the seed cell communicates toward the front wall along a portion of the length of the seed cell extending from a central axis of the aperture to the front wall to form the front wall, whereby each of the seed cells tends to receive and retain a single seed therein as it passes through the seed mass;
    means defining a separate seed discharge area within the first chamber;
    means for providing a reduced pressure within the second chamber;
    means for sealing the seed discharge area of the first chamber from the reduced pressure within the second chamber; and
    wherein each of the apertures is chamfered so as to have a radius which increases in the direction from the recess at the first side of the disk to the second side of the disk.

2. The invention set forth in claim 1, further including means for providing generally atmospheric pressure within the first chamber, and wherein the means providing a reduced pressure within the second chamber provides a pressure substantially lower than atmospheric therein.

3. The invention set forth in claim 1, wherein the housing is of generally cylindrical configuration, the means for introducing seeds into the first chamber includes an opening in the housing and a seed chute coupled to the opening, the means defining a separate seed discharge area includes a first wall extending across the first chamber, the means for providing a reduced pressure includes a vacuum source coupled to the second chamber, and the means for sealing the seed discharge area includes a second wall extending across the second chamber and a seal disposed between the second wall and the seed disk.

4. The invention set forth in claim 1, wherein the front wall of each of the seed cells slopes into the cell from the first surface of the disk to the aperture with which the recess forming the seed cell communicates and the opposite rear wall of each of the seed cells slopes in to the cell from the first surface of the disk to the aperture with a steeper slope than the slope of the front wall, the rear wall forming a wall which acts to contact and accelerate seeds in the mass of seeds in the first chamber.

5. The invention set forth in claim 4, wherein the aperture is closer to the rear wall at the first surface of the disk than to the front wall at the first surface of the disk.

6. The invention set forth in claim 1, wherein each of the seed cells is configured so that a seed residing therein extends outwardly from the first surface of the disk.

7. The invention set forth in claim 6, wherein not substantially less than half the thickness of a seed residing within the seed cells extends outwardly from the first surface of the disk.

8. The invention set forth in claim 1, wherein each of the seed cells forms a generally teardrop-shaped outline in the first surface of the seed disk.

9. The invention set forth in claim 1, wherein seeds to be contained within the seed cells are elongated in shape and have a nominal length in a direction of elongation and a nominal width which is less than the nominal length, the nominal width being not substantially less than the width of each of the seed cells.

10. The invention set forth in claim 1, further including second and third rows of apertures in the seed disk arranged circumferentially about the seed disk and extending through the thickness of the seed disk and being generally concentric with each other and with the at least one row of apertures, the seed disk having a further plurality of recesses therein at the first side thereof, each of the recesses communicating with a different one of the apertures in the second and third rows of apertures and defining a seed cell.

11. The invention set forth in claim 1, further including a row of fins on the first side of the seed disk, the row of fins being arranged circumferentially about the disk and being disposed adjacent at least one row of apertures.

12. The invention set forth in claim 11, wherein each fin in the row of fins is associated with and assumes a like circumferential position relative to a different one of the apertures in the at least one row of apertures.

13. The invention set forth in claim 1, wherein the means for providing a reduced pressure within the second chamber provides a pressure differential of not more than about 2.0 KPa.

14. The invention as set forth in claim 3 wherein the housing is adapted to assume a generally vertical position when in operation; and
a vacuum port located essentially at the bottom of the housing when the housing assumes the generally vertical position, the vacuum port communicating with the second chamber and being adapted to be coupled to a vacuum source outside of the housing, whereby a vacuum is communicated to the second side of the disk and debris which collects at the bottom of the second chamber is removed from the housing.

15. The invention set forth in claim 14, wherein the housing has an outer wall at an opposite side of the second chamber from the seed disk and the vacuum port comprises a hollow tube extending through the outer wall of the housing.

16. A seed meter assembly comprising the combination of:
a first half-shell of generally circular configuration and having a generally disk-shaped back wall and an adjoining side wall of generally cylindrical configuration;
a second half-shell of generally circular configuration adapted to close over the first half-shell and form a housing therewith, the second half-shell having a generally disk-shaped back wall and an adjoining side wall of generally cylindrical configuration;
a hub assembly mounted within the first half-shell substantially at the center of the back wall thereof, the hub assembly being adapted to rotatably mount a seed disk thereon;
a seed inlet chute formed on the outside of the back wall of the first half-shell and terminating at an opening in the back wall adjacent the side wall of the first half-shell;
a separating wall mounted on the back wall of the first half-shell adjacent the hub assembly, the separating wall extending between two different portions of the side wall of the first half-shell and defining a seed discharge chamber with a part of the side wall between the two different portions;
a seed discharge chute of elongated, hollow configuration joined to the side wall of the first half-shell at an aperture in the side wall and communicating with the seed discharge chamber;
a vacuum port formed on the outside of the back wall of the second half-shell and terminating in an opening in the back wall of the second half-shell; and
a seal mounted within the second half-shell and adapted to seal against a seed disk, a portion of the seal extending across the back wall of the second half-shell so as to separate a portion of the second half-shell disposed opposite the seed discharge chamber from the remainder of the second half-shell including the opening in the back wall at which the vacuum port terminates when the second half-shell is closed over the first half-shell; and
further including a hinge having opposite portions coupled to the side walls of the first and second half-shells and a clasp mounted on the side wall of one of the first and second half-shells opposite the hinge.

17. The invention set forth in claim 16, further including a brush extending along a substantial portion of the length of the separating wall opposite the back wall of the first half-shell.

18. The invention set forth in claim 16, further including an air inlet opening in the back wall and an adjoining portion of the side wall of the first half-shell opposite the opening in the back wall at which the seed input chute terminates.

19. In a seed meter in which a seed disk is rotatably mounted within a housing having a chamber therein at one side of the seed disk adapted to contain a quantity of seeds, the improvement comprising a seed retainer brush of elongated configuration extending across the chamber and having a side extending along the length thereof in contact with the one side of the seed disk, the seed retainer brush acting to prevent seeds in the chamber from spilling into a second chamber defined in part by the seed retainer brush, a divider wall of elongated configuration extending across the chamber and mounting the seed retainer brush along a top edge thereof opposite the housing, and a seed baffle retainer mounted within the chamber to control the flow of seeds into the chamber, and wherein the divider wall has a portion thereof extending along and coupled to the seed baffle retainer.

20. A planting arrangement comprising the combination of a seed hopper having a converging bottom portion thereof which terminates in a pair of seed discharge apertures disposed in spaced-apart relation, and a seed meter having a housing, a seed disk rotatably mounted within the housing and coupled to a driven coupling on the outside of the housing, the housing having a pair of seed receiving apertures therein disposed on opposite sides of the driven coupling, and means for mounting the seed meter on the converging bottom portion of the seed hopper so that each of the seed receiving apertures in the housing is disposed adjacent a different one of the pair of seed discharge apertures in the converging bottom portion of the seed hopper.

21. The invention set forth in claim 20, wherein the housing of the seed meter has an air inlet at a top portion thereof above the driven coupling and the pair of seed receiving apertures, and the converging bottom portion of the seed hopper has a cavity therein in which the seed meter is received, the cavity having an upper portion extending over the top portion of the housing of the seed meter an partially covering the air inlet.

22. The invention set forth in claim 21, further including a clip mounted on the converging bottom portion of the seed hopper within the cavity, the clip being adapted to engage the air inlet in the housing of the seed meter to aid in mounting the seed meter on the converging bottom portion of the seed hopper.

23. A seed disk for use in a seed meter, the seed disk having at least one row of apertures therein extending through the thickness of the seed disk between opposite first and second sides of the seed disk, the at least one row of apertures being arranged generally circumferentially about the seed disk, the seed disk further having a plurality of recesses therein at the first side thereof, each of the recesses communicating with a different one of the apertures and defining a seed cell, at least some of the recesses having a first portion thereof extending into the disk from the first side of the disk and having a given curvature and encircling and spaced-apart from the aperture with which the recess communicates and a second portion thereof extending between the first portion and the aperture with which the recess communicates and having a curvature greater than the given curvature and encircling and intersecting with the aperture with which the recess communicates.

24. The invention set forth in claim 23, wherein the first portion is generally of partially spherical configuration and has a given radius and the second portion is generally of partially spherical configuration and has a radius smaller than the given radius.

25. A seed disk for use in a seed meter, the seed disk having at least one row of apertures therein extending through the thickness of the seed disk between opposite first and second sides of the seed disk, the at least one row of apertures being arranged generally circumferentially about the seed disk, the seed disk further having a plurality of recesses therein at the first side thereof, each of the recesses communicating with a different one of the apertures and defining a seed cell, at least some of the recesses having a first portion thereof extending into the disk from the first side of the disk and having a given curvature and a second portion thereof extending between the first portion and the aperture with which the recess communicates and having a curvature greater than the given curvature, the first and second portions of the at least some of the recesses intersecting along a curved line lying within a plane generally parallel to the first side of the disk.

26. A seed disk for use in a seed meter, the seed disk having at least one row of apertures therein extending through the thickness of the seed disk between opposite first and second sides of the seed disk, the at least one row of apertures being arranged generally circumferentially about the seed disk, the seed disk further having a plurality of recesses therein at the first side thereof, each of the recesses communicating with a different one of the apertures and defining a seed cell, at least some of the recesses having a first portion thereof extending into the disk from the first side of the disk and having a given curvature and a second portion thereof extending between the first portion and the aperture with which the recess communicates and having a curvature greater than the given curvature, each of the at least some of the recesses having a front cell wall extending from the first side of the disk through the first and second portions to the aperture with which the recess communicates and having a slope profile, and an opposite rear cell wall extending from the first side of the disk through the first and second portions to the aperture with which the recess communicates and having a slope profile steeper than the slope profile of the front cell wall.

27. A seed meter assembly comprising the combination of:
- a first half-shell of generally circular configuration and having a generally disk-shaped back wall and an adjoining side wall of generally cylindrical configuration;
- a second half-shell of generally circular configuration adapted to close over the first half-shell and form a housing therewith, the second half-shell having a generally disk-shaped back wall and an adjoining side wall of generally cylindrical configuration;
- a hub assembly mounted within the first half-shell substantially at the center of the back wall thereof, the hub assembly being adapted to rotatably mount a seed disk thereon;
- a seed inlet chute formed on the outside of the back wall of the first half-shell and terminating at an opening in the back wall adjacent the side wall of the first half-shell;
- a separating wall mounted on the back wall of the first half-shell adjacent the hub assembly, the separating wall extending between two different portions of the side wall of the first half-shell and defining a seed discharge chamber with a part of the side wall between the two different portions;
- a seed discharge chute of elongated, hollow configuration joined to the side wall of the first half-shell at an aperture in the side wall and communicating with the seed discharge chamber;
- a vacuum port formed on the outside of the back wall of the second half-shell and terminating in an opening in the back wall of the second half-shell; and
- a seal mounted within the second half-shell and adapted to seal against a seed disk, a portion of the seal extending across the back wall of the second half-shell so as to separate a portion of the second half-shell disposed opposite the seed discharge chamber from the remainder of the second half-shell including the opening in the back wall at which the vacuum port terminates when the second half-shell is closed over the first half-shell, wherein the seal is mounted on the generally disk-shaped back wall of the second half-shell and includes a main portion thereof extending around a major portion of a circle, the portion of the seal which separates a portion of the second half-shell disposed opposite the seed discharge chamber from the remainder of the second half-shell extending inwardly from the circle along a portion of the circle other than the major portion.

28. The invention set forth in claim 27, wherein the seal is an endless member.

29. A seed meter assembly comprising the combination of:
- a generally disk-shaped housing having a hollow interior and adapted to assume a generally vertical position when in operation;

a seed disk rotatably mounted within the hollow interior of the housing and dividing the hollow interior into a first chamber at a first side of the seed disk and a second chamber at an opposite second side of the seed disk, the seed disk having at least one circumferential row of apertures therein extending through the thickness thereof between the first and second sides and a plurality of recesses in the first side thereof, each of the recesses communicating with a different one of the apertures and forming a seed cell;

means for forming a seed reservoir within the first chamber and at the first side of the seed disk;

means for forming a seed discharge area within the first chamber and separated from the seed reservoir;

means for sealing the seed discharge area from the second chamber;

means for coupling a source of reduced pressure to the second chamber;

the housing having an outer wall on an opposite side of the first chamber from the seed disk, the outer wall having at least one opening in an upper portion thereof for receiving seeds;

the housing further having a back wall on an opposite side of the first chamber from the seed disk and joined to the outer wall and extending into the region of the seed disk; and a seed baffle mounted on the back wall, the seed baffle defining a seed chute between a surface thereof and the outer wall beneath the at least one opening in the upper portion of the outer wall, the seed baffle having a lower edge defining with the back wall an opening at the bottom of the seed chute, wherein the lower edge defines the uppermost portion of the opening, and the seed baffle is changeable to vary the location of the lower edge and therefore the shape of the opening for forming an entrance of desired size and shape into the seed reservoir from the seed chute.

30. A seed meter assembly comprising the combination of:

a generally disk-shaped housing having a hollow interior and adapted to assume a generally vertical position when in operation;

a seed disk rotatably mounted within the hollow interior of the housing and dividing the hollow interior into a first chamber at a first side of the seed disk and a second chamber at an opposite second side of the seed disk, the seed disk having at least one circumferential row of apertures therein extending through the thickness thereof between the first and second sides and a plurality of recesses in the first side thereof, each of the recessed communicating with a different one of the apertures and forming a seed cell;

means for forming a seed reservoir within the first chamber and at the first side of the seed disk;

means for forming a seed discharge area within the first chamber and separated from the seed reservoir;

means for sealing the seed discharge area from the second chamber;

means for coupling a source of reduced pressure to the second chamber;

the housing having an outer wall on an opposite side of the first chamber from the seed disk, the outer wall having at least one opening in an upper portion thereof for receiving seeds;

the housing further having a back wall on an opposite side of the first chamber from the seed disk and joined to the outer wall and extending into the region of the seed disk; and a seed baffle insert mounted on the back wall, the seed baffle insert defining a seed chute between a surface thereof and the outer wall beneath the at least one opening in the upper portion of the outer wall, the seed baffle inset having a lower edge defining with the back wall an opening at the bottom of the seed chute, the opening forming an entrance of desired size and shape into the seed reservoir from the seed chute, wherein the seed baffle insert has a main portion thereof of relatively thin, generally planar configuration disposed generally parallel to the first side of the seed disk and a lower lip portion of relatively thin, generally planar configuration extending in a direction toward the outer wall from the main portion.

* * * * *